(12) United States Patent
Lee et al.

(10) Patent No.: US 12,340,364 B2
(45) Date of Patent: Jun. 24, 2025

(54) METHOD AND APPARATUS FOR COMMUNICATION SYSTEM USING USER INTERFACES FOR INSTANT MESSAGING SERVICE ASSOCIATED WITH ITEM TRANSACTIONS

(71) Applicant: KAKAO CORP., Jeju-Si (KR)

(72) Inventors: Sang Kyeong Lee, Seongnam-Si (KR); Seo Ji Lee, Seongnam-Si (KR); Lim Ah Lee, Seongnam-Si (KR); Yoon Sun Lee, Seongnam-Si (KR); Hyun Ji Oh, Seongnam-Si (KR); Je Woo Song, Seongnam-Si (KR)

(73) Assignee: KAKAO CORP., Jeju-Si (KR)

( * ) Notice: Subject to any disclaimer, the term of this patent is extended or adjusted under 35 U.S.C. 154(b) by 0 days.

(21) Appl. No.: 18/380,310

(22) Filed: Oct. 16, 2023

(65) Prior Publication Data

US 2024/0135371 A1 Apr. 25, 2024
US 2024/0232874 A9 Jul. 11, 2024

(30) Foreign Application Priority Data

Oct. 19, 2022 (KR) .................. 10-2022-0135147
Dec. 7, 2022 (KR) .................. 10-2022-0169701

(51) Int. Cl.
*G06Q 20/38* (2012.01)
*G06F 3/0482* (2013.01)
(Continued)

(52) U.S. Cl.
CPC ......... *G06Q 20/386* (2020.05); *G06F 3/0482* (2013.01); *H04L 51/046* (2013.01); *H04L 51/07* (2022.05); *H04L 51/10* (2013.01)

(58) Field of Classification Search
None
See application file for complete search history.

(56) References Cited

U.S. PATENT DOCUMENTS 10,861,109 B2 * 12/2020 Lai .................. H04L 51/04
10,880,398 B2 * 12/2020 Li ................... H04L 51/18
(Continued)

FOREIGN PATENT DOCUMENTS

CA 2787103 A1 * 7/2011 ....... G06F 17/30867
EP 4373062 A1 * 5/2024 ......... G06F 3/04847
(Continued)

OTHER PUBLICATIONS

Apr. 8, 2024—Korean Office Action (KR)—App No. 10-2022-0169701.

*Primary Examiner* — Sandarva Khanal
(74) *Attorney, Agent, or Firm* — Banner & Witcoff, Ltd.

(57) ABSTRACT

An instant messaging service may be configured to receive transaction information and enable users to respond to those transactions through chat messages. A first user interface screen associated with an item transaction may be provided in a chatroom interface of an executed messenger application. The first user interface screen may comprise an interfacing object associated with a list of user interface templates. Based on a user selection of the interface object and based at least one exposure condition associated with the list of user interface templates, at least one user interface template may be selected from the list of user interface templates for display in a second user interface screen of the executed messenger application. In a second user interface screen of the executed messenger application, a first user interface template of the at least one user interface template may be displayed.

20 Claims, 18 Drawing Sheets

(51) Int. Cl.
*H04L 51/046* (2022.01)
*H04L 51/07* (2022.01)
*H04L 51/10* (2022.01)

(56) References Cited

U.S. PATENT DOCUMENTS

| | | | | |
|---|---|---|---|---|
| 2005/0088693 A1* | 4/2005 | Schnoebelen | ............ | A23G 3/28 |
| | | | | 358/1.18 |
| 2005/0278297 A1* | 12/2005 | Nelson | ................ | G06F 16/958 |
| 2006/0156063 A1* | 7/2006 | Mazzarella | ............ | H04L 67/56 |
| | | | | 714/12 |
| 2010/0121764 A1* | 5/2010 | Niedermeyer | ......... | G06Q 20/40 |
| | | | | 705/317 |
| 2010/0293236 A1* | 11/2010 | Wisner | ................ | G06Q 10/107 |
| | | | | 709/206 |
| 2012/0203681 A1* | 8/2012 | Lele | ....................... | G06Q 40/04 |
| | | | | 705/37 |
| 2013/0124643 A1* | 5/2013 | DeLuca | ................ | H04L 51/216 |
| | | | | 709/204 |
| 2013/0311294 A1* | 11/2013 | Ward | ................. | G06Q 30/0264 |
| | | | | 705/14.64 |
| 2014/0258055 A1* | 9/2014 | Wolfe | ................... | G06Q 20/321 |
| | | | | 705/30 |
| 2015/0066757 A1* | 3/2015 | Shenoy | .............. | G06Q 20/3274 |
| | | | | 705/41 |
| 2015/0074205 A1* | 3/2015 | Westphal | .............. | H04L 51/214 |
| | | | | 709/206 |
| 2015/0186013 A1* | 7/2015 | Li | ........................ | G06F 3/04886 |
| | | | | 715/773 |
| 2015/0188861 A1* | 7/2015 | Esplin | .................... | H04L 51/02 |
| | | | | 709/206 |
| 2016/0036739 A1* | 2/2016 | Glass | ..................... | H04W 4/12 |
| | | | | 709/206 |
| 2016/0247216 A1* | 8/2016 | Nadler | ............... | G06Q 30/0633 |
| 2016/0275584 A1* | 9/2016 | Gibson | ............... | G06Q 30/0621 |
| 2018/0115526 A1* | 4/2018 | Armitage | ............. | H04L 63/083 |

FOREIGN PATENT DOCUMENTS

| | | |
|---|---|---|
| KR | 10-2007-0090657 A | 9/2007 |
| KR | 10-2016-0011772 A | 2/2016 |
| KR | 101633212 B1 | 6/2016 |
| KR | 10-2017-0054919 A | 5/2017 |
| KR | 10-2019-0037907 A | 4/2019 |
| WO | WO-0193057 A1 * 12/2001 | ............ G06F 3/121 |
| WO | WO-2008116072 A1 * 9/2008 | ............ G06Q 30/02 |
| WO | WO-2014142830 A1 * 9/2014 | ............ G06F 3/048 |

\* cited by examiner

METHOD AND APPARATUS FOR COMMUNICATION SYSTEM USING USER INTERFACES FOR INSTANT MESSAGING SERVICE ASSOCIATED WITH ITEM TRANSACTIONS

CROSS-REFERENCE TO RELATED APPLICATION(S)

This application claims the priority to and benefit of Korean Patent Application No. 10-2022-0135147, filed on Oct. 19, 2022, and Korean Patent Application No. 10-2022-0169701, filed on Dec. 7, 2022, in the Korean Intellectual Property Office, the disclosures of which are incorporated herein by reference for all purposes.

BACKGROUND

With the development of mobile smart devices, the use of an online platform service to communicate with other users via network has increased. The online platform services for interaction with other users may include, as representative examples, a social networking service (SNS), which is an online platform for generating and consolidating social relationships through communication among users, information sharing, and expansion of personal connections, and an instant messaging service (IMS), which is an online platform for real-time content communication between two or more users. With the increase of communication through mobile devices, the online platform services support a function of transferring various items between users by incorporating various online platforms, besides 1:1 communication with other users.

SUMMARY

An aspect provides a template list for generating a message for an item.

Another aspect also provides a template list for generating a message for an item in which the composition of a template varies depending on a product corresponding to the item or a time of a request for generating the message.

A method and apparatus may provide an instant messaging service associated with one or more item transactions. A first user interface screen associated with an item transaction may be provided in a chatroom interface of an executed messenger application. The first user interface screen may comprise an interfacing object associated with a list of user interface templates. Based on a user selection of the interface object and based at least one exposure condition associated with the list of user interface templates, at least one user interface template may be selected from the list of user interface templates for display in a second user interface screen of the executed messenger application. In a second user interface screen of the executed messenger application, a first user interface template of the at least one user interface template may be displayed. User interfaces of the executed messenger application and/or user interfaces of the chatroom interface may be improved and the communication interface associated with the one or more item transactions may be improved, for example, by filtering user interface templates based on the at least one exposure condition.

However, technical aspects are not limited to the foregoing aspects, and there may be other technical aspects.

A terminal may comprise: a display configured to receive at least one user input; a communication interface; at least one processor; and memory storing instructions that, when executed by the at least one processor, cause the terminal to: execute a messenger application installed on the terminal, wherein a user of the messenger application is logged into, via the terminal and using a user account of an instant messaging service associated with one or more item transactions, the instant messaging service, and wherein the instant messaging service is provided via communication between the terminal and a messaging service server; receive, based on an item transaction service provided by an item transaction server linked to the messaging service server, an indication associated with the item transaction service; display, in a chatroom interface of the executed messenger application, a first user interface screen associated with the item transaction service, wherein the first user interface screen associated with the item transaction service comprises: sender information associated with the item transaction; a message associated with the item transaction; information indicating an identifier of an item of the item transaction; and an interfacing object associated with a list of user interface templates; receive, based on a user selection of the interfacing object and based on at least one exposure condition associated with the list of user interface templates, at least one user interface template selected from the list of user interface templates; display, in a second user interface screen of the executed messenger application, a first user interface template of the at least one user interface template, wherein the first user interface template comprises: an editable user interface element; and a non-editable user interface element; modify, based on an editing input, the editable user interface element; and transmit, based on the modified editable user interface element, a message comprising a modified template associated with the first user interface template.

The second user interface screen may be configured to: include a preset message phrase, of the editable user interface element, configured to be selectable; and based on a selection of the preset message phrase, display a virtual keyboard to edit the preset message phrase.

The second user interface screen may be configured to: include a preset message phrase, of the editable user interface element, configured to be editable; include a restoring interfacing object configured to be selectable; and based on a selection of the restoring interfacing object, restore the preset message phrase.

The second user interface screen may be configured to: include a preset message phrase configured to be not editable; and include a message notifying that the preset message phrase is not editable.

The second user interface screen may be configured to be maintained, based on a message phrase length being less than or equal to a threshold value, at a default size; and wherein the message comprising the modified template is framed within the default size.

The second user interface screen may be configured to be expanded, based on a message phrase length exceeding a threshold value, beyond a default size; and wherein the message comprising the modified template is framed in a greater size than the default size.

The at least one exposure condition may comprise at least one of: a reception time of the user selection of the interfacing object, a brand associated with the item, or a category of the item.

The instructions, when executed by the at least one processor, may cause the terminal to: access the item transaction service provided by the item transaction server.

A terminal may comprise: a display configured to receive at least one user input; a communication interface; at least one processor; and memory storing instructions that, when executed by the at least one processor, cause the terminal to: execute a messenger application installed on the terminal, wherein a user of the messenger application is logged into, via the terminal and using a user account of an instant messaging service associated with one or more item transactions, the instant messaging service, and wherein the instant messaging service is provided via communication between the terminal and a messaging service server; receive, based on an item transaction service provided by an item transaction server linked to the messaging service server, an indication associated with the item transaction service; display, in a first user interface screen of the executed messenger application, a first interfacing object associated with the item transaction service; determine, based on a user selection of the first interfacing object and based on at least one exposure condition associated with a list of templates, at least one template selected from the list of templates; display a second user interface screen of the executed messenger application, wherein the second user interface screen comprises: a tab area configured to display selectable template types; a template list area configured to display, based on a selected type of the selectable template types, a list of selectable templates of the at least one template; a preview window area configured to display a selected template of the selectable templates and an editing tool to edit the selected template; and a second interfacing object configured to transmit an edited template; and transmit, to another terminal via the messaging service server, a message comprising the edited template.

The instructions, when executed by the at least one processor, may cause the terminal to display the first user interface screen in a chatroom interface; and wherein the template list area is further configured to display, based on the at least one exposure condition, the list of selectable templates.

The at least one exposure condition may comprise at least one of: a reception time of request for displaying the second user interface screen, a brand associated with an item of an item transaction, or a category of the item.

The preview window area may be further configured to: include a preset message phrase configured to be selectable; and based on a selection of the preset message phrase, display a virtual keyboard as the editing tool to edit the preset message phrase.

The preview window area may be further configured to: include a preset message phrase configured to be editable; include a restoring interfacing object configured to be selectable; and based on a selection of the restoring interfacing object, restore the preset message phrase.

The preview window area may be further configured to: include a preset message phrase configured to be not editable; and include a message notifying that the preset message phrase is not editable.

The preview window area may be further configured to be maintained, based on a message phrase length being less than or equal to a threshold value, at a default size; and wherein the second interfacing object is further configured to transmit, based on a user input, the edited template, wherein the edited template is framed within the default size.

The preview window area may be further configured to be expanded, based on a message phrase length exceeding a threshold value, beyond a default size; and wherein the second interfacing object is further configured to transmit, based on a user input, the edited template, wherein the edited template is framed in a greater size than the default size.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
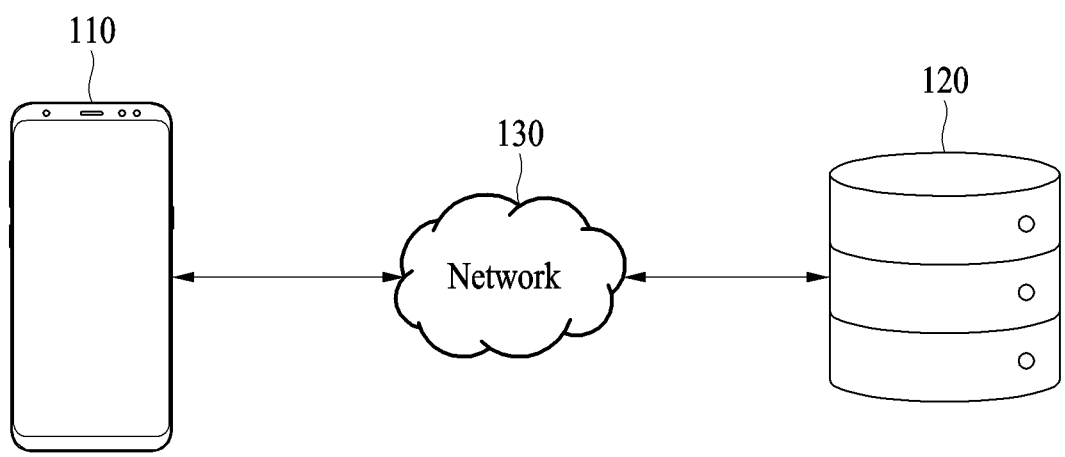
FIG. 1 is a diagram illustrating a system for an instant messaging service.

The following detailed structural or functional description is provided as an example only and various alterations and modifications may be made to various features of the present disclosure. Here, examples are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, various examples will be described in detail with reference to the accompanying drawings. When describing the various examples with reference to the accompanying drawings, like reference numerals refer to like elements and a repeated description related thereto will be omitted.

FIG. 1 is a diagram illustrating a system for an instant messaging service.

Referring to FIG. 1, a system 100 (e.g., for a groupware service or any other services) may include a terminal 110 (e.g., a user terminal, such as a mobile phone, a tablet, a personal computer, etc.), one or more computing devices (e.g., a server 120), and a network 130. A detailed hardware configuration of the server 120 and the terminal 110 is described below.

The server 120 may include a server providing the instant messaging service through the network 130. For example, the server 120 may include a server providing the instant messaging service for the transmission and reception of a message about an item (e.g., including a gift or any other physical items or digital items). The instant messaging service may include a service allowing a plurality of users to chat in real time by transmitting text messages, voice messages, media files, and other instant messages through the network 130, such as wireless Internet or a wireless communication network, and services related thereto.

The server 120 may be linked with a web for the instant messaging service or an application (hereinafter, the app) for the instant messaging service executed by the terminal 110 to provide a user interface (UI), a function, an operation, and/or a service. Hereinafter, the web for the instant messaging service or the app for the instant messaging service may be referred to as an instant messenger, but aspects of the present disclosure are not limited thereto.

The terminal 110 may include, for example, a personal computer (PC), a netbook computer, a laptop computer, a personal digital appliance (PDA), a smartphone, a wearable device, and devices for performing a similar function.

The instant messenger provided by the server 120 may be installed in the terminal 110 and may be executed by one or more processors of the terminal 110. A user may use the instant messaging service provided by the server 120 by executing the instant messenger in the terminal 110. The user may generate a user account by subscribing to the instant messaging service through the instant messenger. The user may use the instant messaging service through the terminal 110 of an account subscribing to the instant messaging service. The terminal 110 of the account subscribing to the instant messaging service may be a terminal logging in with the account subscribing to the instant messaging service.

The server 120 may be linked to an item transaction service provided by an item transaction server (e.g., including a gift-giving service or a gift-giving server). The server 120 may provide the item transaction service linked to the instant messaging service or may provide the item transaction service by interworking with the item transaction server providing the item transaction service. The item transaction service may be a service for obtaining and/or purchasing an item (e.g., a product) based on an online platform (e.g., a social commerce platform), designating a receiver of the item, and delivering the item to the receiver. For example, information that the item is acquired in the item transaction service and information that an item is delivered may be shared with a sender (e.g., a requester, a purchaser, etc.) and the receiver through a chatroom provided in the instant messaging service. For example, the user may access the item transaction service through the instant messenger. The user may use the item transaction service by using the account subscribing to the instant messaging service. Alternatively, the user may use the instant messaging service by using an account subscribing to the item transaction service.

The server 120 linked to the item transaction service and/or the item transaction server may provide a function of transmitting the message about the item. The message about the item may include a reply message transmitted to the user sending the item by the user who receives the item. The message about the item may include a message transmitted with the product corresponding to the item or a message transmitted as the item. The server 120 may provide the instant messaging service for the transmission and reception of the message about the item, and the user may use the instant messaging service for the transmission and reception of the message about the item through the terminal logging in with the account subscribing to the instant messaging service or the account subscribing to the item transaction service. Hereinafter, the terminal logging in with the account subscribing to the instant messaging service or the account subscribing to the item transaction service may be referred to as a terminal of the user or a terminal. The instant messaging service for the transmission and reception of the message about the item is described in detail below.

A method and apparatus may provide an instant messaging service associated with one or more item transactions. A first user interface screen associated with an item transaction may be provided in a chatroom interface of an executed messenger application. The first user interface screen may comprise an interfacing object associated with a list of user interface templates. Based on a user selection of the interface object and based at least one exposure condition associated with the list of user interface templates, at least one user interface template may be selected from the list of user interface templates for display in a second user interface screen of the executed messenger application. In a second user interface screen of the executed messenger application, a first user interface template of the at least one user interface template may be displayed. User interfaces of the executed messenger application and/or user interfaces of the chatroom interface may be improved and the communication interface associated with the one or more item transactions may be improved, for example, by filtering user interface templates based on the at least one exposure condition.

Figure 2:
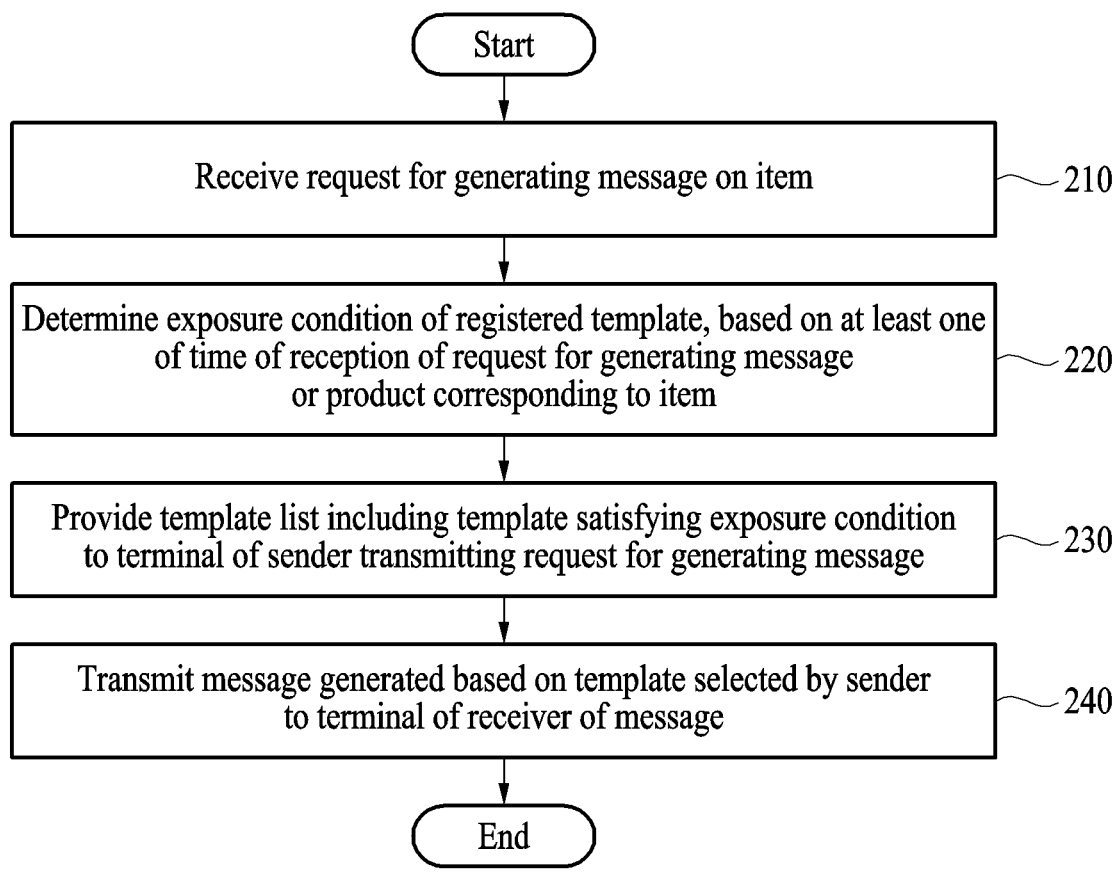
FIG. 2 is a diagram illustrating an operating method of a server providing the instant messaging service.

FIG. 2 is a diagram illustrating an operating method of a server providing the instant messaging service.

For example, the server providing the instant messaging service may correspond to the server 120 of FIG. 1.

Referring to FIG. 2, the operating method of the server providing the instant messaging service may include operation 210 of receiving a request for generating a message about an item. The message about the item may include a message transmitted as the item and/or a message transmitted as a reply to the item. The request for generating the message about the item may be transmitted from a terminal of a user to the server. The terminal of the user may be a terminal logging in with an account subscribing to the instant messaging service or an account subscribing to an item transaction service linked to the server. The request for generating the message about the item may include information on a receiver of the message. The receiver of the message may be specified through the account subscribing to the instant messaging service or the account subscribing to the item transaction service linked to the server. The user of the terminal transmitting the request for generating the message about the item to the server may designate the receiver of the message. A user account of the terminal transmitting the request for generating the message about the item to the server may be referred to as a sender transmitting the request for generating the message or a sender. A user account designated as the receiver of the message may be referred to as a receiver.

The request for generating the message about the item may include a request for a reply message transmitted to the user account (hereinafter, an item sender) sending the item by the user account (hereinafter, an item receiver) receiving the item. The reply message may be a message transmitted to the item sender by the item receiver to express how they feel about receiving the item, such as gratitude, to the person providing the item. In the case of the reply message, a sender transmitting the request for generating the message may be the item receiver, and a receiver of the message may be the item sender.

Operation 210 of receiving the request for generating the message about the item may include receiving the request for generating the message about the item, based on a message indicating the reception of the item transmitted through a chatroom in which the sender and the receiver participate. The request for generating the message about the item may include the request for the reply message. The message indicating the reception of the item may be a message notifying the item receiver of the reception of the item transmitted by the item sender, which may be transmitted through a chatroom in which the item receiver participates. For example, the chatroom, through which the message indicating the reception of the item is transmitted, may include a chatroom in which the item receiver and the item sender participate or a chatroom of the item receiver and an official account for the item transaction service. The message indicating the reception of the item may include information on the item. For example, information on a product sent as the item and a message transmitted with the item. The message indicating the reception of the item may include an interfacing object for requesting the transmission of the reply message for the item. The interfacing object may be an object implemented to output data corresponding to an input of the user through interaction with the user and may include, for example, a button, an input window, a display window, or the like. The operation of requesting the transmission of the reply message for the item through the message indicating the reception of the item is described in detail below.

The request for generating the message about the item may include a request for the message transmitted as the item or the message transmitted with the product sent as the item. In this case, a sender transmitting the request for generating the message may be the item sender and a receiver of the message may be the item receiver.

Hereinafter, descriptions are provided under the assumption that the request for generating the message about the item is the request for generating the reply message. The operations related to the message about the gift to be described in detail below may be also applicable when the message about the item is the message transmitted as the item or the message transmitted with the product sent as the item.

The operating method of the server providing the instant messaging service may include operation 220 of determining an exposure condition of a registered template, based on at least one of a time of the reception of the request for generating the message or the product corresponding to the item.

The registered template may include one or more templates registered in the server. A template may be a preset format of a message to generate the message and may include, as elements of the template, for example, at least one of a message phrase, a background of the message, and an icon of the message. The template may include a method of displaying preset elements.

The exposure condition may be a condition for determining whether to expose or provide the template and may include, for example, at least one of a condition of exposing the template when the product belongs to a certain brand, a condition of exposing the template when the product belongs to a certain category, and a condition of exposing the template when the time of the reception of the request for generating the message belongs to a preset interval.

The exposure condition may be set for each template registered in the server. For example, a first exposure condition may be set for a first template, and a second exposure condition may be set for a second template. The server may determine the exposure condition for each of the registered templates. For example, when the exposure condition set for the first template is the condition of exposing the template when the product corresponding to the item belongs to a certain brand, the server may determine whether the product corresponding to the item is a product of the certain brand. When the product corresponding to the item is the product of the certain brand, the first template may be determined to be exposed. For example, when the exposure condition set for the second template is the condition of exposing the template when the product belongs to a certain category (e.g., food, cosmetics, etc.), the server may determine whether the product corresponding to the item is a product of the certain category. When the product corresponding to the item is the product of the certain category, the second template may be determined to be exposed. For example, when the exposure condition set for a third template is the condition of exposing the template when the time of the reception of the request for generating the message belongs to a preset interval, the server may determine whether the time of the reception of the request for generating the message belongs to the preset interval. When the time of the reception of the request for generating the message is determined to belong to the preset interval, the third template may be determined to be exposed.

One or more exposure conditions may be set for the template. When a plurality of exposure conditions are set, the template may be determined to be exposed when all the exposure conditions are satisfied or at least one of the exposure conditions is satisfied. In other words, the exposure conditions may be combined based on an and condition or an or condition.

The operating method of the server providing the instant messaging service may include operation 230 of providing a template list including the template satisfying the exposure condition to the terminal of the sender transmitting the request for generating the message. The template satisfying the exposure condition may be exposed to the user through the template list. The template not satisfying the exposure condition may not be included in the template list provided to the terminal and may not be exposed to the user.

The template list may include template lists respectively corresponding to a plurality of types. Operation 230 of providing the template list may include determining the type of the template satisfying the exposure condition and exposing the template through a template list corresponding to the determined type. The type of template may be a type related to a concept, a theme, or a mood and may include, for example, at least one of a polite type, a friendly type, and a fun type.

The type of the template may include the type of a template for which the exposure condition is set and the type of a template for which the exposure condition is not set. The template for which the exposure condition is not set may always be exposed regardless of the time of the reception of the request for generating the message or the product corresponding to the item. The template for which the exposure condition is set may be exposed or may not be exposed depending on the time of the reception of the request for generating the message or the product corresponding to the item.

The operating method of the server providing the instant messaging service may include operation 240 of transmitting a message generated based on a template selected by the sender to the terminal of the receiver of the message. The message generated based on the template may include at least one of a message phrase, a background of the message, and an icon of the message that are included in the template. The message may include information on the product corresponding to the item.

Operation 240 of transmitting the message may include identifying an element, set to be editable, of the template selected by the sender, changing the template based on an input of editing the element, and transmitting a message generated based on the changed template. At least some of the elements of the template may be edited by an input of the user. For example, a preset message phrase included in the template may be changed by the user's input.

Editable and noneditable elements may be set for each template. An editable element may be changed by the user's input, but a change by the user's input may not be allowed for a noneditable element. For example, at least some of the elements, set to be editable, of a first template among the registered templates may be different from at least some of the elements, set to be editable, of a second template among the registered templates.

Operation 240 of the transmitting the message may further include identifying a message phrase set corresponding to the selected template, controlling the size of the selected template, based on the length of the message phrase, and generating the message based on the controlled size of the selected template. In other words, the display size of the template may be controlled depending on the length of the message phrase set for the template. For example, when the length of the message phrase is less than or equal to a threshold value, the display size of the template may be determined to be a first value, and when the length of the message phrase exceeds the threshold value, the display size of the template may be determined to be a second value.

The message generated based on the template may be transmitted to the terminal of the receiver through a chatroom. The chatroom through which the message is transmitted may be a chatroom in which the receiver and the sender participate and/or the chatroom of the item receiver and the official account of the item transaction service.

Figure 3:
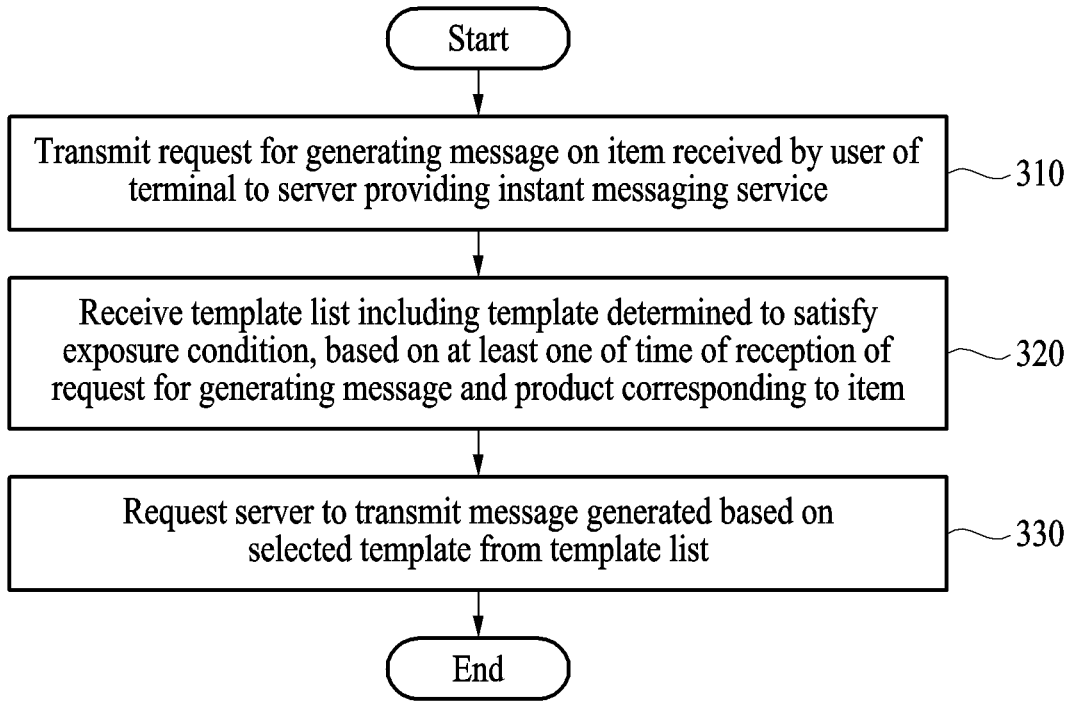
FIG. 3 is a diagram illustrating an operating method of a terminal using the instant messaging service.

FIG. 3 is a diagram illustrating an operating method of a terminal using the instant messaging service.

For example, the terminal may be a terminal of a sender transmitting a request for generating a message. For example, the terminal using the instant messaging service may correspond to the terminal 110 of FIG. 1.

Referring to FIG. 3, the operating method of the terminal using the instant messaging service may include operation 310 of transmitting the request for generating a message about an item received by a user of the terminal to a server providing the instant messaging service.

Operation 310 of transmitting the request for generating the message may include transmitting a request for generating a reply message for the item, in which an item sender who sends the item is designated as a receiver, to the server through a message indicating the reception of the item. In the case of the reply message, a sender transmitting the request for generating the message may be an item receiver, and a receiver of the message may be the item sender. As described above, the message indicating the reception of the item may be a message notifying the item receiver of the reception of the item transmitted by the item sender, which may be transmitted through a chatroom in which the item receiver participates. For example, the chatroom, through which the message indicating the reception of the item is transmitted, may include a chatroom in which the item receiver and the item sender participate or a chatroom of the item receiver and an official account for the item transaction service.

The request for generating the message about the item may include a request for the message transmitted as the item or the message transmitted with the product sent as the item. In this case, a sender transmitting the request for generating the message may be the item sender and a receiver of the message may be the item receiver. Hereinafter, descriptions are provided under the assumption that the request for generating the message about the item is the request for generating the reply message.

The operating method of the terminal using the instant messaging service may include operation 320 of receiving a template list including a template determined to satisfy an exposure condition, based on at least one of a time of the reception of the request for generating the message and a product corresponding to the item. As described above, the template satisfying the exposure condition may be exposed to the user through the template list. The template not satisfying the exposure condition may not be included in the template list provided to the terminal and may not be exposed to the user.

The operating method of the terminal using the instant messaging service may include operation 330 of requesting the server to transmit a message generated based on a selected template from the template list.

Operation 330 of requesting the server to transmit the message may include requesting the editing of the selected template, changing the selected template based on an input of editing the selected template when the selected template is editable, and requesting transmission of a message generated based on the changed template. The template may include one or more elements, such as a message phrase, a background of the message, and an icon of the message. The template may include an element set to be editable. For example, the message phrase among the elements included in the template may be set to be editable. In this case, the message phrase included in the template may be changed to a phrase input by the user. The message generated based on the template may include the phrase input by the user.

Figure 4A:
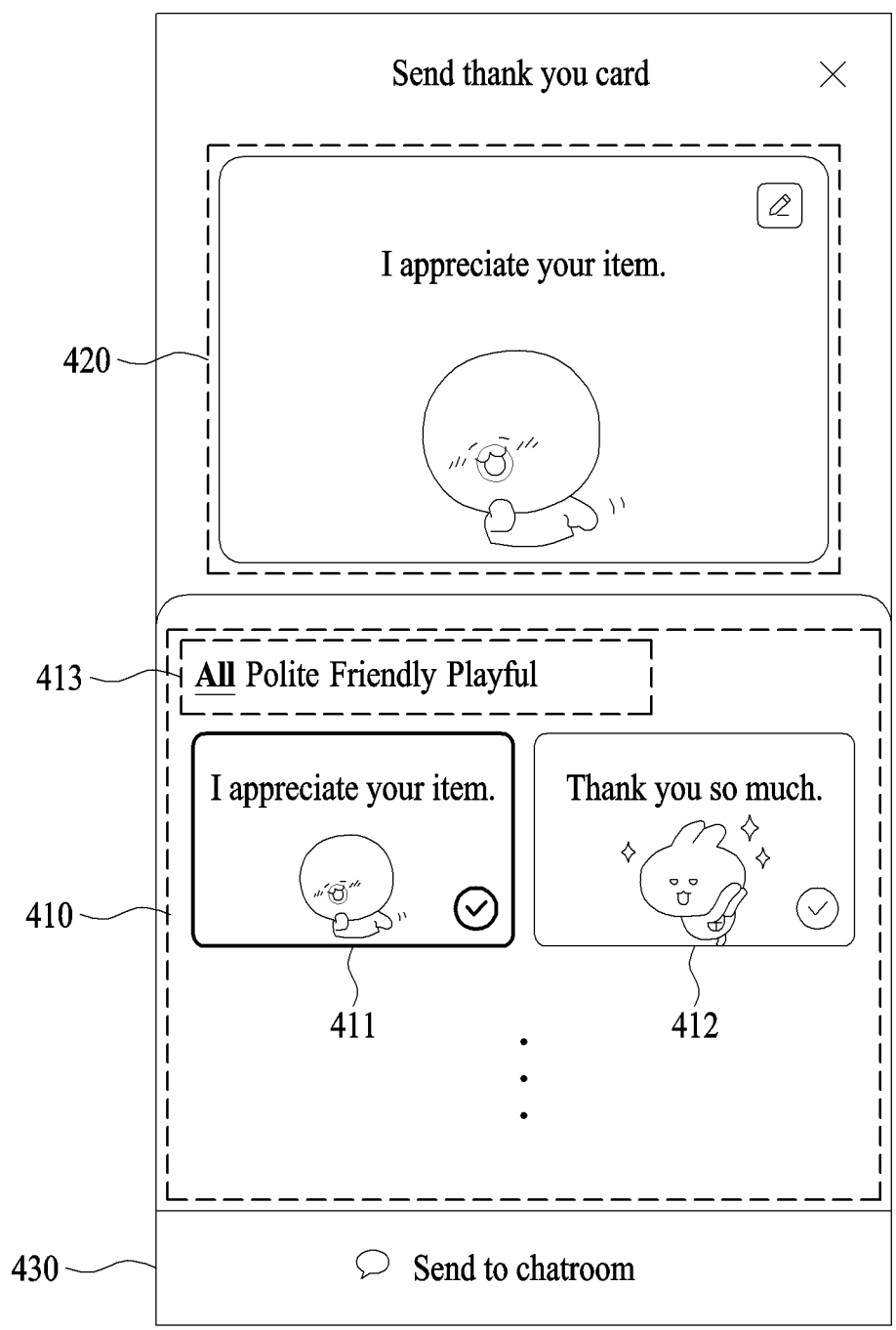
FIG. 4A is a diagram illustrating a screen of a template list output to a terminal.

FIG. 4A is a diagram illustrating a screen of a template list output to a terminal.

Referring to a screen 401 of FIG. 4A, a template list 410 may be provided to the terminal of a sender transmitting a request for generating a message about an item. The template list 410 may include one or more templates 411 and 412 that satisfy an exposure condition. Each of the templates 411 and 412 may include elements, such as a preset message phrase, a background of the message, and an icon of the message.

The template list 410 may include template lists respectively corresponding to one or more types. For example, the type of a template may include a polite type, a friendly type, and a playful type. A template list corresponding to each type may include template(s) of the type. The template lists respectively corresponding to the types may be divided by a tab 413 and be provided. A template list corresponding to a type (e.g., a polite type) may be provided by an input of selecting a tab (e.g., a 'polite' tab) named by the type.

One of templates included in the template list may be selected by an input of a user. The selected template may be displayed through a preview window 420. The preview window 420 may include an editing tool for editing the selected template. The editing tool for editing a template is described in detail below.

Referring to the screen 401, an interfacing object 430 for requesting the transmission of a message corresponding to the selected template may be provided. The message generated based on the selected template by the input of selecting the interfacing object 430 may be transmitted to the terminal of a receiver.

Figure 4B:
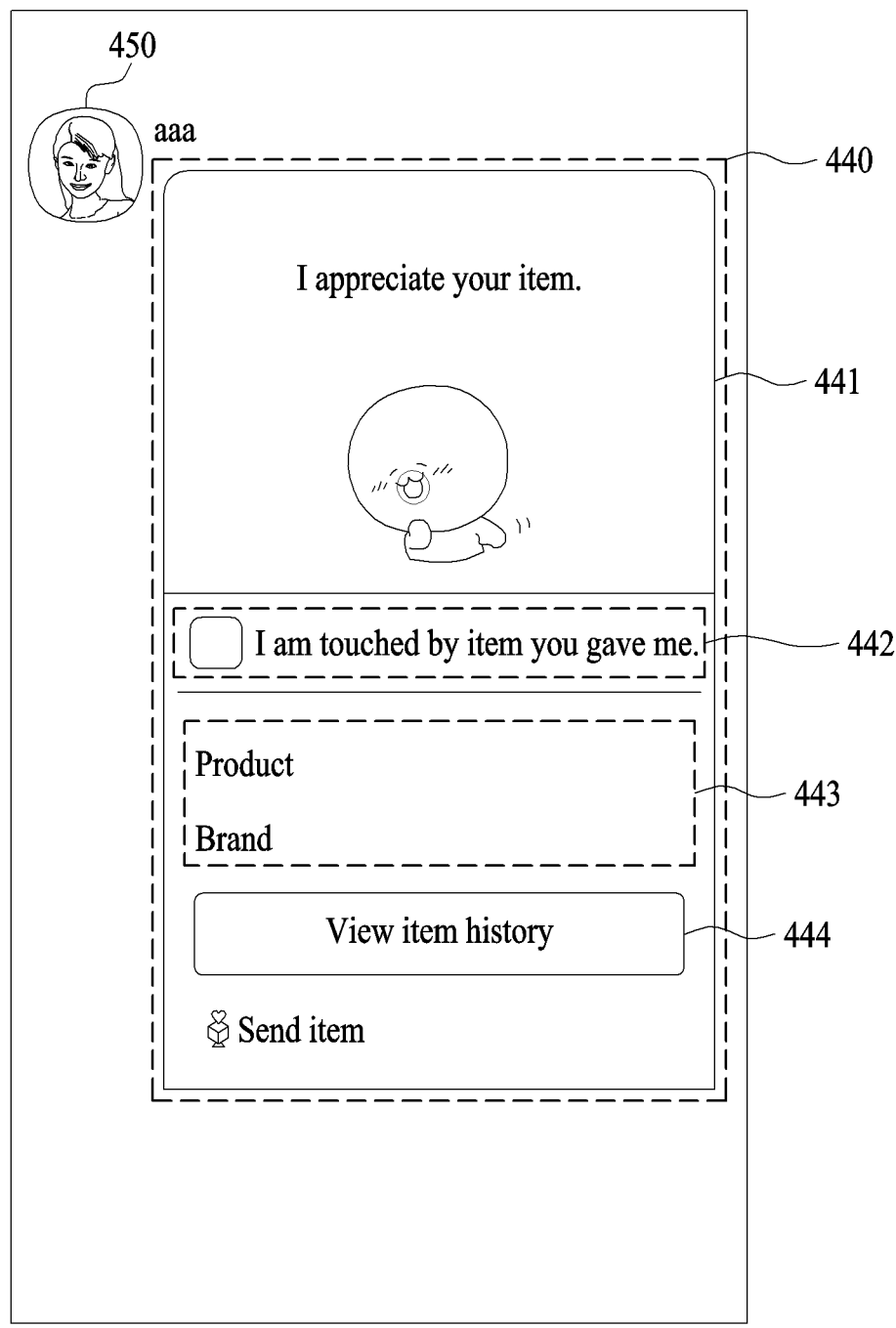
FIG. 4B is a diagram illustrating a screen on which a message about an item is transmitted that is output to the terminal.

FIG. 4B is a diagram illustrating a screen on which a message about an item is transmitted that is output to the terminal.

Referring to a screen 402, a message 440 on the item may be displayed through a chatroom interface. A chatroom through which the message 440 is transmitted may be a chatroom in which a receiver and a sender participate and/or a chatroom of the receiver and an official account of an item transaction service. The message 440 may include a template 441 including elements, such as a message phrase, a background of the message, and an icon of the message.

The message 440 may include information on the sender of the message 440. For example, a profile 450 of the sender may be displayed adjacent to the message 440 to provide information on the sender of the message 440 to the receiver.

The message 440 may be a reply message for a received item. The message 440 may include information 442 indicating the reply message for the received item and information 443 indicating the received item.

The message 440 may include an interfacing object 444 connecting to a history of items sent and received by the sender and the receiver. The history of the items sent and received by the sender and the receiver may be displayed on the terminal by an input of selecting the interfacing object 444. The item history may include an object (e.g., an interfacing object, a visual object, such as an icon, an image, a banner, a user interface object, a selectable object associated with a linked page, etc.) indicating information on an item sent to the receiver by the sender and/or an object indicating information on an item sent to the sender by the receiver. The item history may include an object indicating information on an item corresponding to the message 440.

Figure 5:
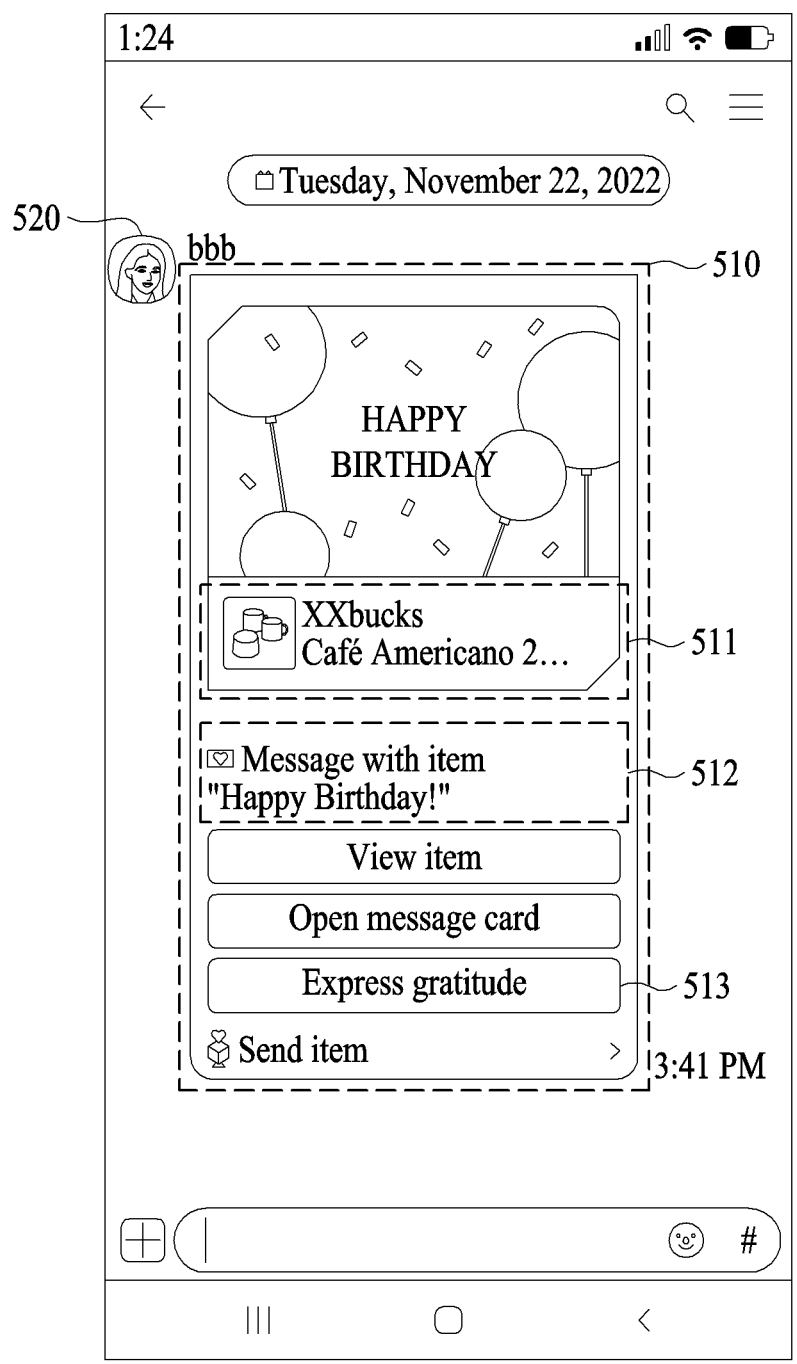
FIG. 5 is a diagram illustrating an operation of requesting the transmission of a message about an item through a message indicating the reception of the item.

FIG. 5 is a diagram illustrating an operation of requesting the transmission of a message about an item through a message indicating the reception of the item.

Referring to a screen 501 of FIG. 5, a message 510 indicating the reception of the item may be transmitted through a chatroom. The message 510 indicating the reception of the item may include information 511 indicating a product corresponding to the item and a message phrase 512 transmitted with the product. The message 510 indicating the reception of the item may include information on an item sender who sends the item. For example, to provide the information on the item sender, a profile 520 of the item sender may be displayed adjacent to the message 510 indicating the reception of the item.

The message 510 indicating the reception of the item may include an interfacing object 513 for requesting the generation of the message about the item. A request for generating the message about the item may be transmitted to a server by an input of selecting the interfacing object 513. The server receiving the request for generating the message about the item may determine an exposure condition of registered templates and may provide a template list including templates satisfying the exposure condition to a terminal of a sender transmitting the request for generating the message about the item. For example, the screen 401 illustrated in FIG. 4A may be output on the terminal by the input of selecting the interfacing object 513.

Figure 6A:
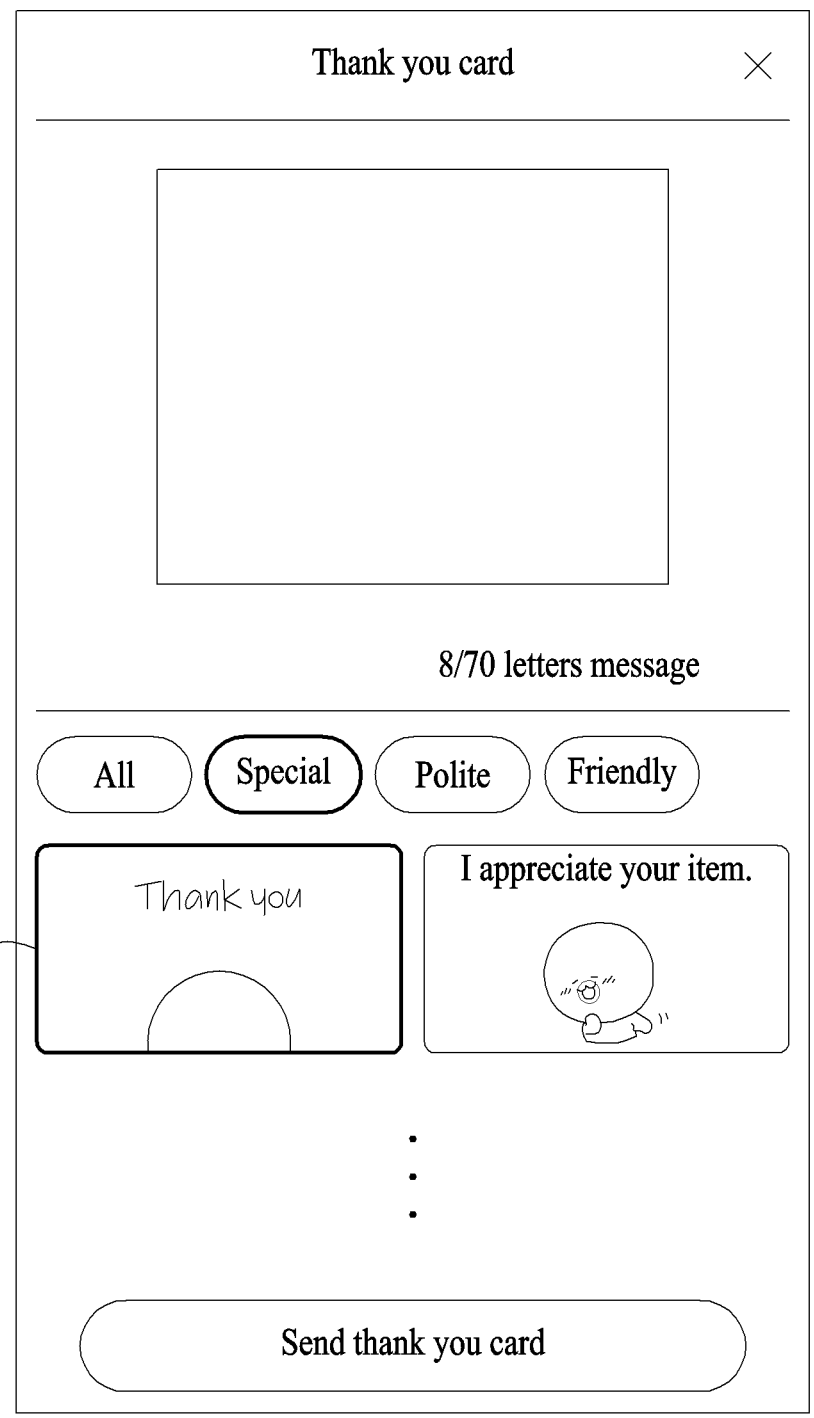
FIGS. 6A to 6C are diagrams each illustrating a template list including an exposure condition.
Figure 6B:
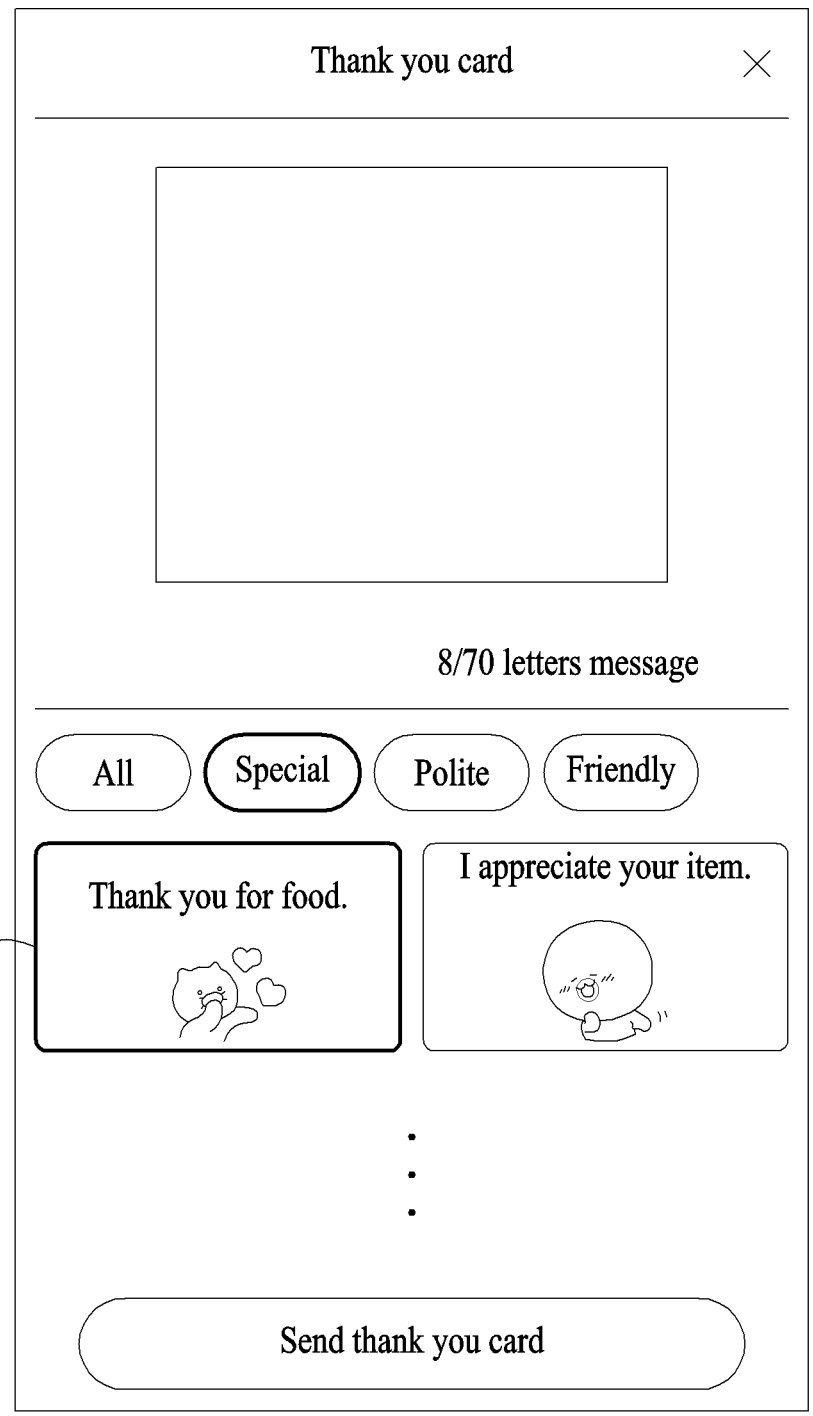
Figure 6C:
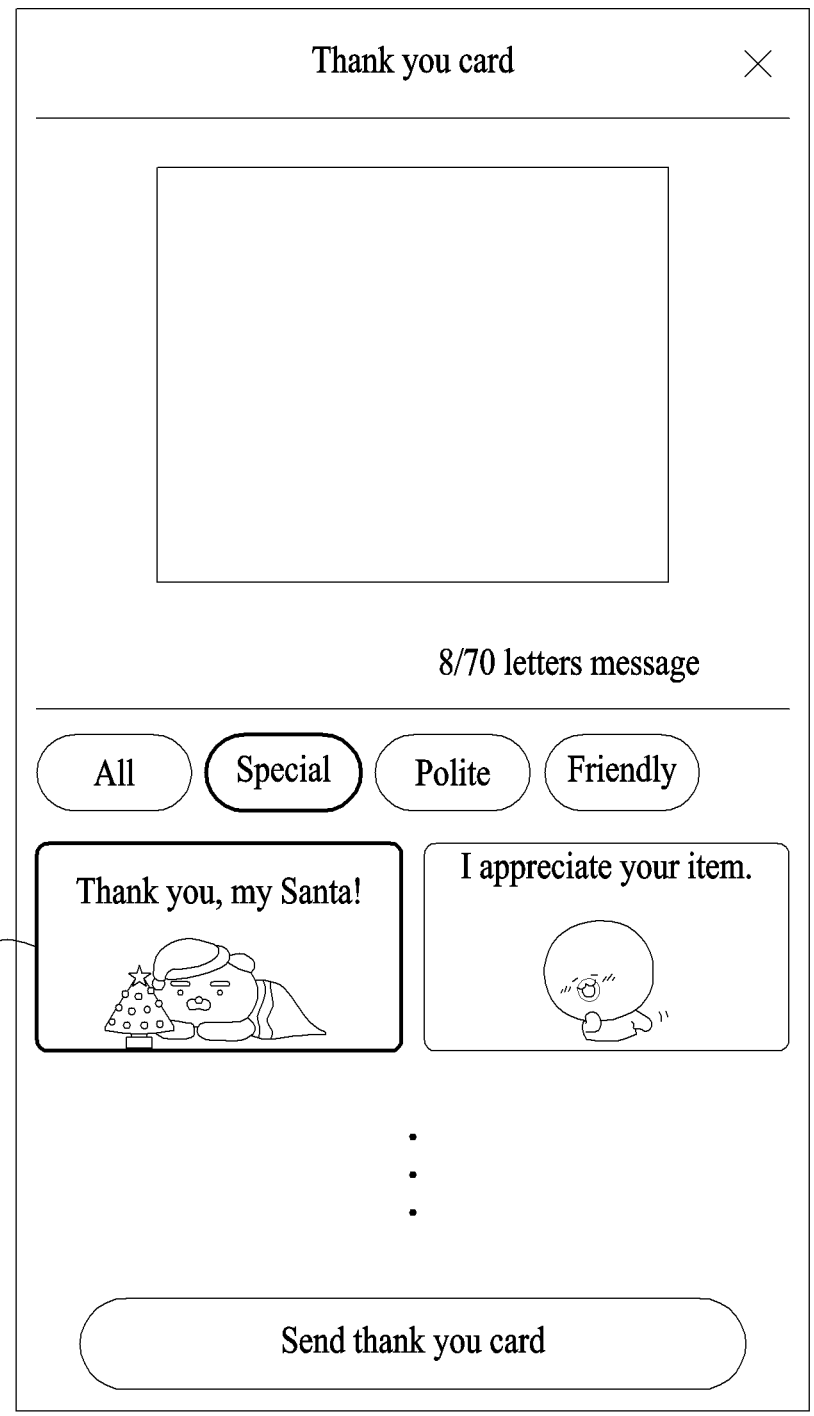

FIGS. 6A to 6C are diagrams each illustrating a template list including an exposure condition.

As described above, the template list may include a template satisfying an exposure condition. The exposure condition may be a condition for determining whether to expose or provide a template to a user and may include, for example, a condition of exposing the template when a product belongs to a certain brand. Referring to a screen 601 of FIG. 6A, a condition of exposing the template when the product is a product of the certain brand (e.g., brand A) may be set for a template 610. The template 610 may be exposed through the template list when the product belongs to brand A. When the product does not belong to brand A, the template 610 may not be exposed through the template list. When the product is not the product of brand A but a product of brand B, the template 610 may be replaced by a template for which a condition of exposing the template when the product belongs to brand b is set.

The exposure condition may be the condition for determining whether to expose or provide a template to the user and may include, for example, a condition of exposing the template when the product belongs to a certain category. Referring to a screen 602 of FIG. 6B, a condition of exposing the template when the product is a product of the certain category (e.g., food) may be set for a template 620. The template 620 may be exposed through the template list when the product belongs to a food category. When the product does not belong to the food category, the template 620 may not be exposed through the template list. When the product is not the product of the food category but a product of a cosmetic category, the template 620 may be replaced by a template for which a condition of exposing the template when the product belongs to the cosmetic category is set.

The exposure condition may be the condition for determining whether to expose or provide a template to the user and may include, for example, a condition of exposing the template when a time of the reception of a request for generating a message belongs to a preset interval. Referring to a screen 603 of FIG. 6C, a condition of exposing the template when the time of the reception of the request for generating a message belongs to the preset interval (e.g., December 25th) may be set for a template 630. The template 630 may be exposed through the template list when the time of the reception of the request for generating the message is a certain time on December 25th. The template 630 may not be exposed through the template list when the time of the reception of the request for generating the message is not the certain time on December 25th. The template 630 may be replaced by a template corresponding to a day when the time of the reception of the request for generating the message is the day of another event (e.g., Chuseok, Korean New Year's Day, January 1st, Valentine's Day, etc.).

FIGS. 7A to 7D are diagrams each illustrating an operation of editing a template.

Figure 7A:
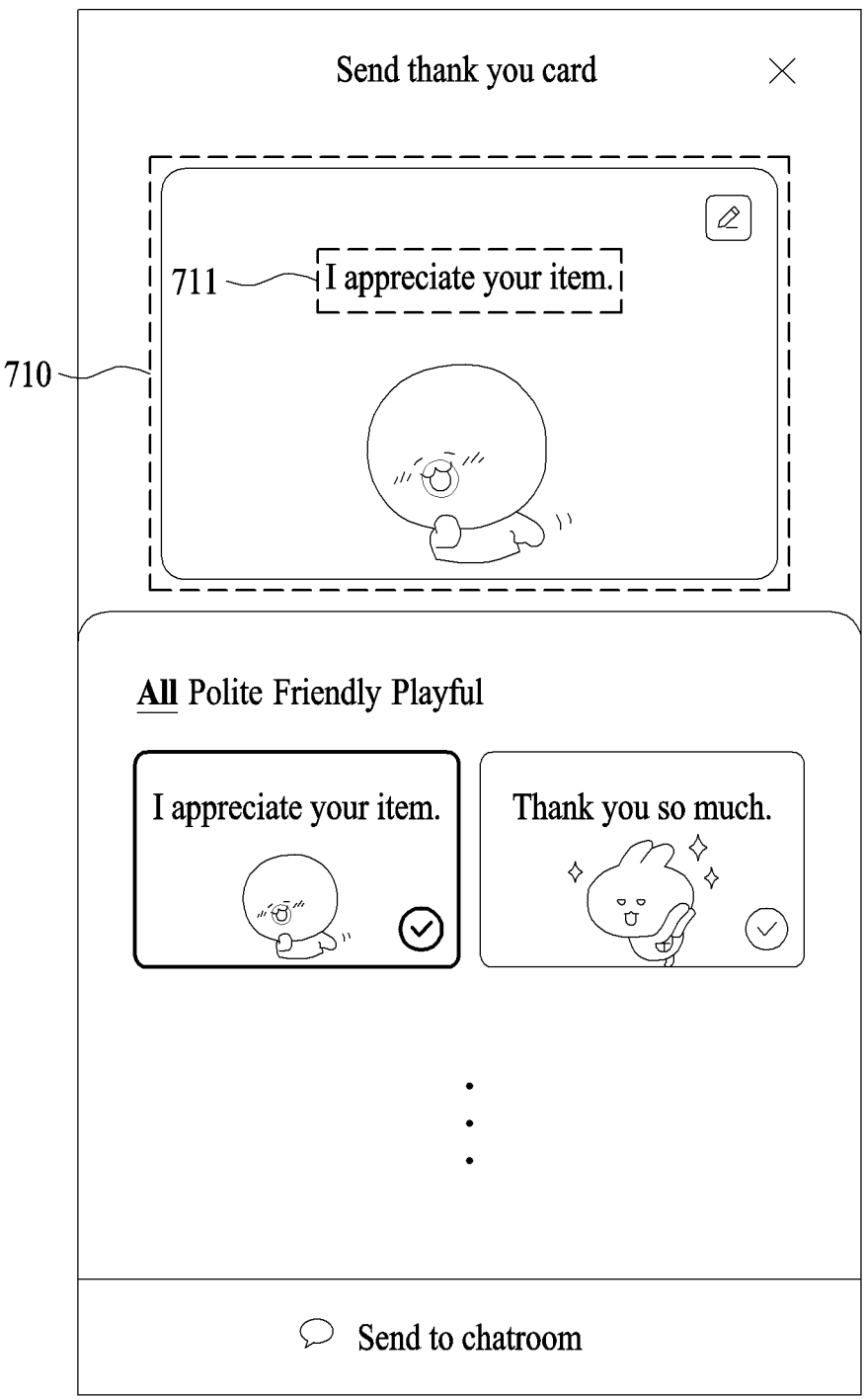
FIGS. 7A to 7D are diagrams each illustrating an operation of editing a template.

Referring to a screen 701 of FIG. 7A, an editing tool may be provided through a preview window 710 displaying a selected template. The elements of the template may be edited through the preview window 710.

The editing tool for editing an element selected by an input of selecting the element of the template displayed through the preview window 710 may be provided. For example, when the background of a message is selected through the preview window 710, the editing tool for changing a background color, a pattern, or the like may be provided. For example, when an icon is selected through the preview window 710, the editing tool for changing the icon to another icon or the position and size of the icon may be provided.

Figure 7B:
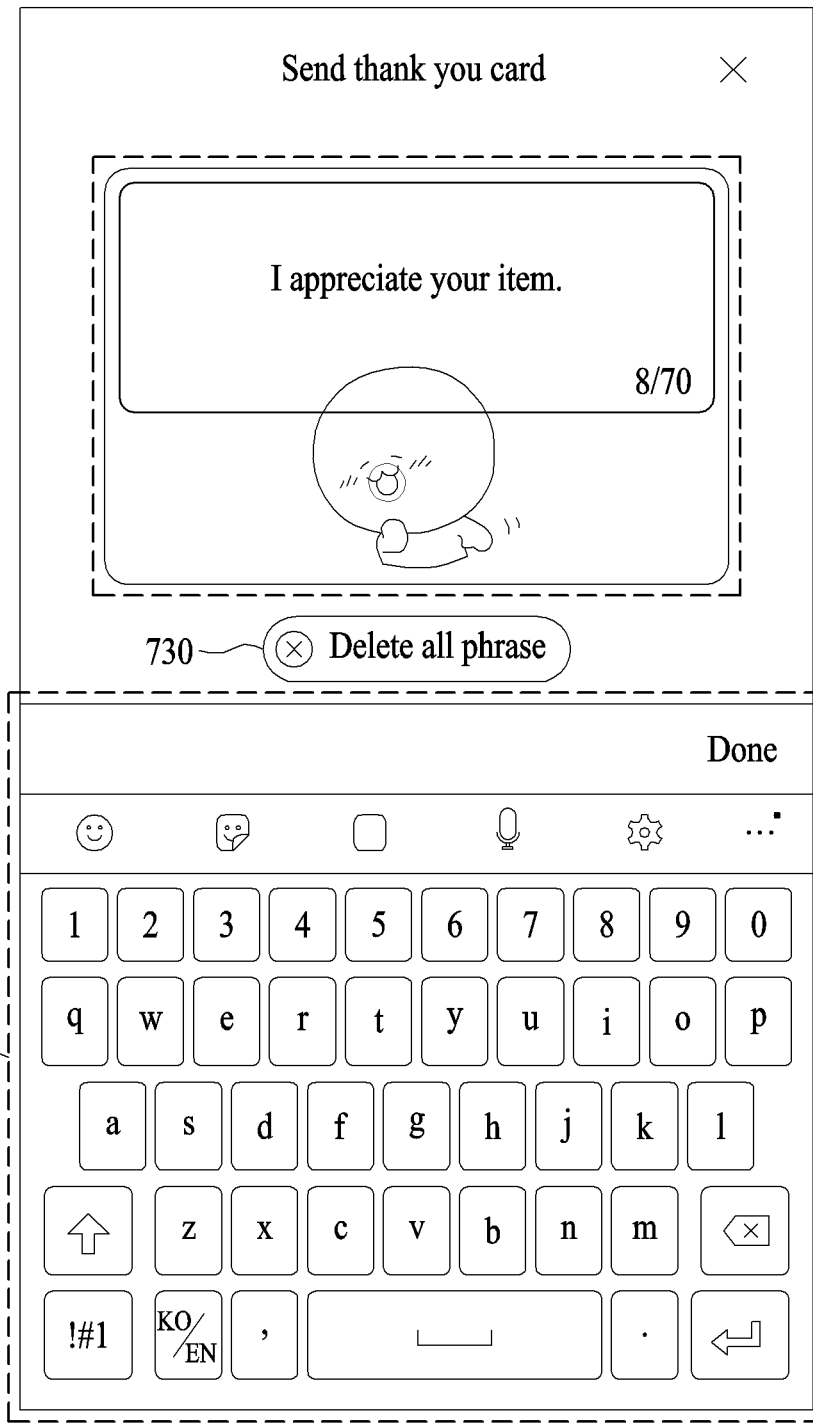

For example, as illustrated in a screen 702 of FIG. 7B, a virtual keyboard 720 for deleting a preset message phrase or inputting a new message phrase by using the editing tool for a message phrase may be provided by the input of selecting a message phrase 711 displayed through the preview window 710. An interfacing object 730 for deleting all preset message phrases may be provided as the editing tool for a message phrase. The preset message phrases may be all deleted by the input of selecting the interfacing object 730.

Figure 7C:
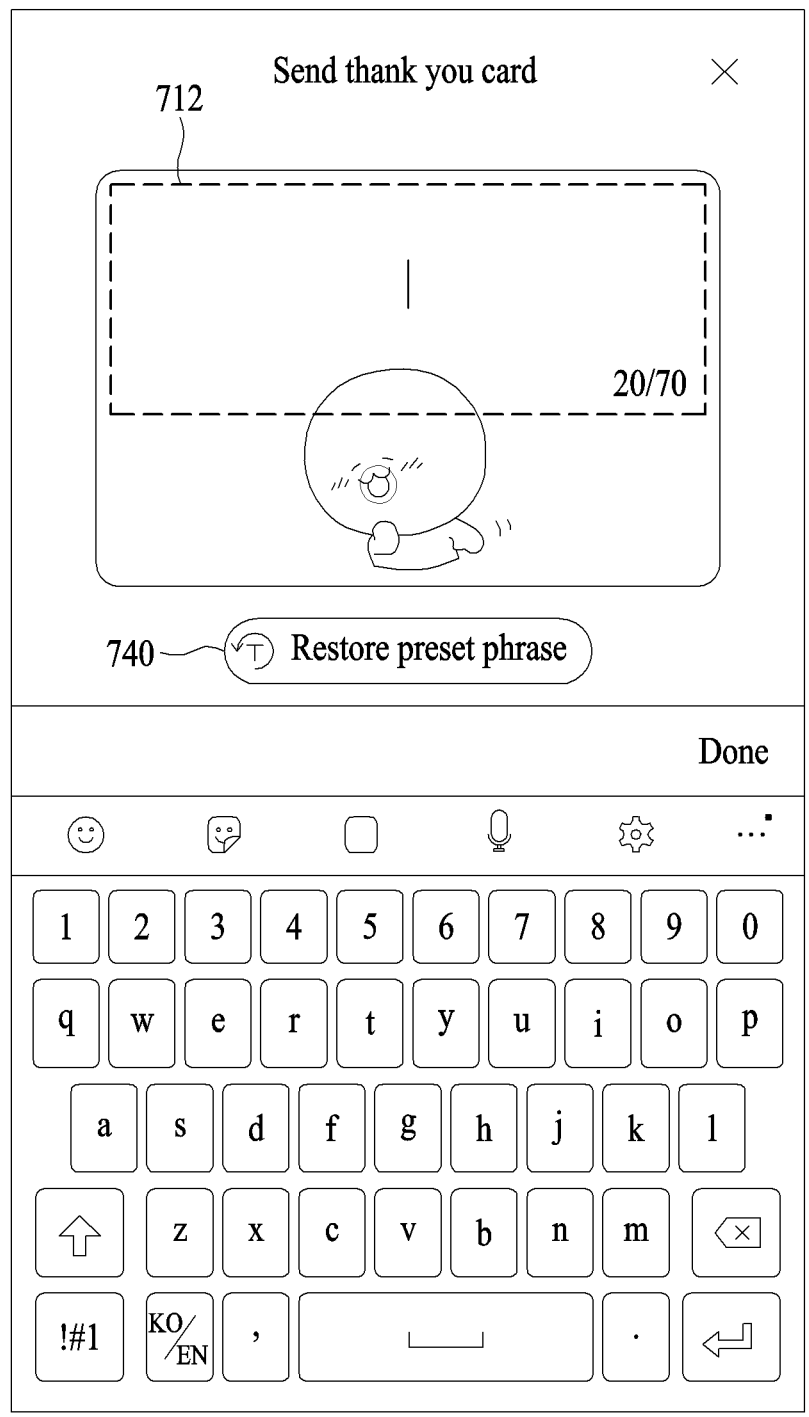
Figure 7D:
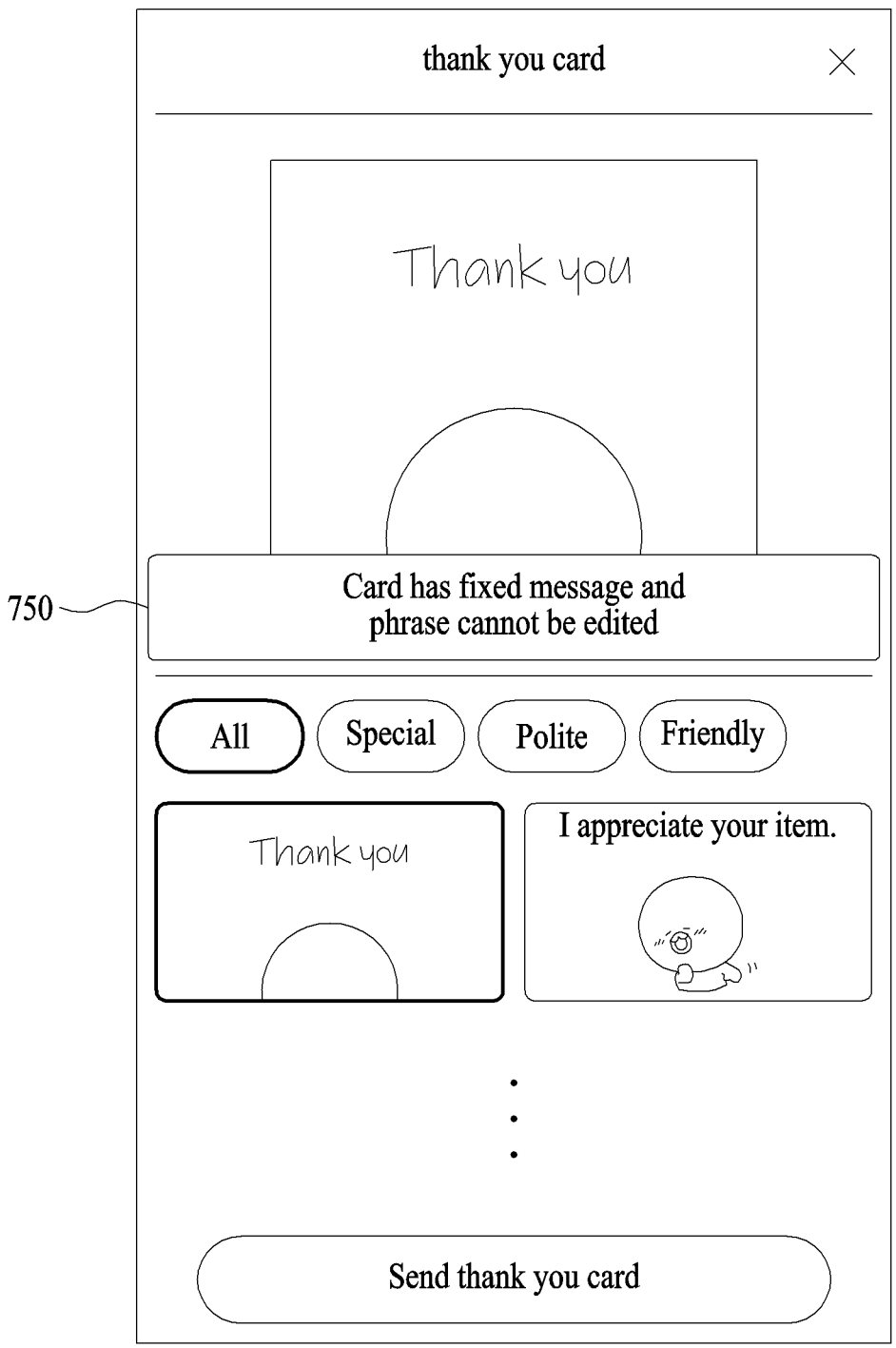

For example, referring to a screen 703 of FIG. 7C, when a message phrase 712 of the template is changed by an input of the user, an interfacing object 740 for restoring a preset message phrase may be provided. By the input of selecting the interfacing object 740, a phrase (e.g., 'I appreciate your item', 'I appreciate your gift', etc.) set for the template may be restored.

The edit of an element of the template may be restricted. For example, referring to a screen 704 of FIG. 7D, when the edit of a message phrase of the template is restricted, and the message phrase of the template is selected through a preview window, a message 750 notifying that the message phrase is not editable may be displayed. The message phrase of the template may not be changed, and a fixed phrase may be transmitted as a message.

Figure 8A:
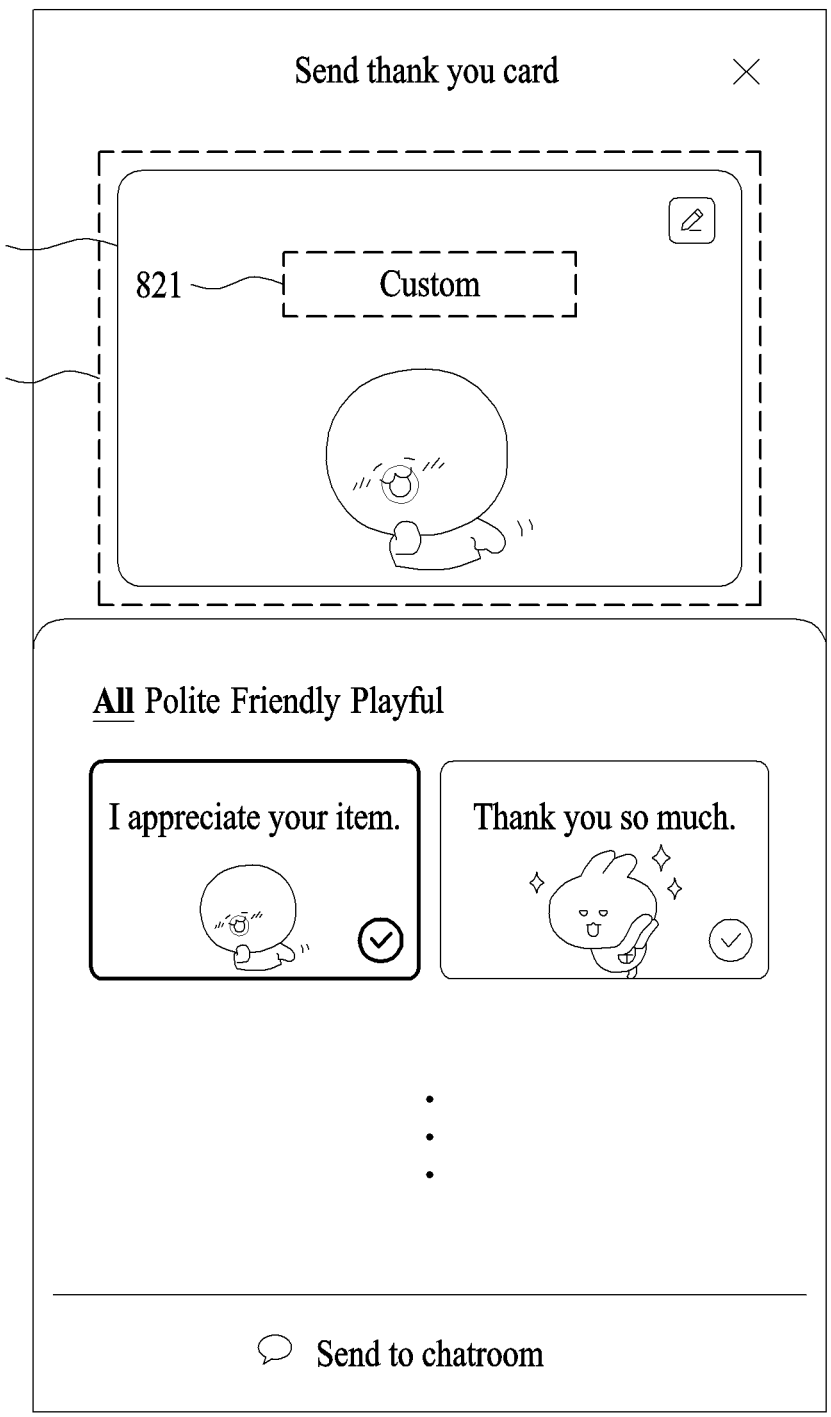
FIGS. 8A and 8B are diagrams each illustrating an operation of controlling the size of a template based on the length of a message phrase set for the template.
Figure 8B:
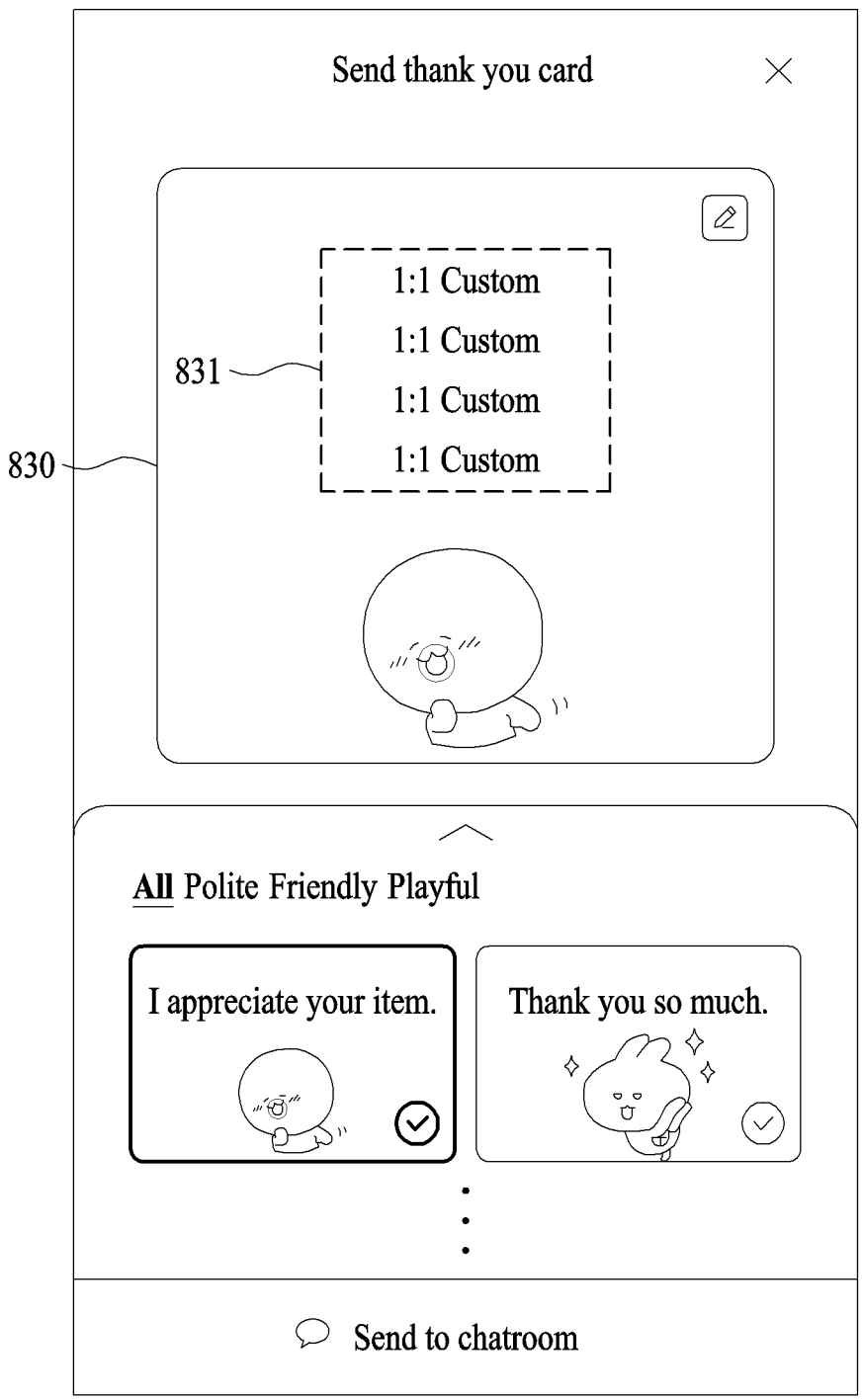

FIGS. 8A and 8B are diagrams each illustrating an operation of controlling the size of a template based on the length of a message phrase set for the template.

Referring to a screen 801 of FIG. 8A, a template 820 to be generated as a message and transmitted may be displayed through a preview window 810. The size of the template 820 may be set to a default size according to the length of a preset message phrase corresponding to the template. When a message phrase 821 of the template 820 is edited, the size of the template may change depending on the length of the message phrase 821. For example, the size of the template may increase corresponding to the length of the phrase or may change to a certain size based on the length of the phrase.

For example, when the length of the message phrase 821 is less than or equal to a first threshold value, the size of the template may be maintained at the default size.

Referring to a screen 802 of FIG. 8B, when the length of the message phrase 831 exceeds the first threshold value, the size of the template 830 may change to a first size. The first size may be greater than the default size. For example, the vertical length of the first size may be greater than the vertical length of the default size. When the length of the message phrase 831 is less than or equal to a second threshold value, the size of the template 830 may be maintained at the first size. In addition, when the length of the message phrase 831 exceeds the second threshold value, the size of the template may change to a second size, and the vertical length of the second size may be greater than the vertical length of the first size.

Meanwhile, the maximum value of the length of a message phrase may be limited. The maximum value of the length of a message phrase may be determined based on the maximum length of a template providable in a chatroom.

Figure 9A:
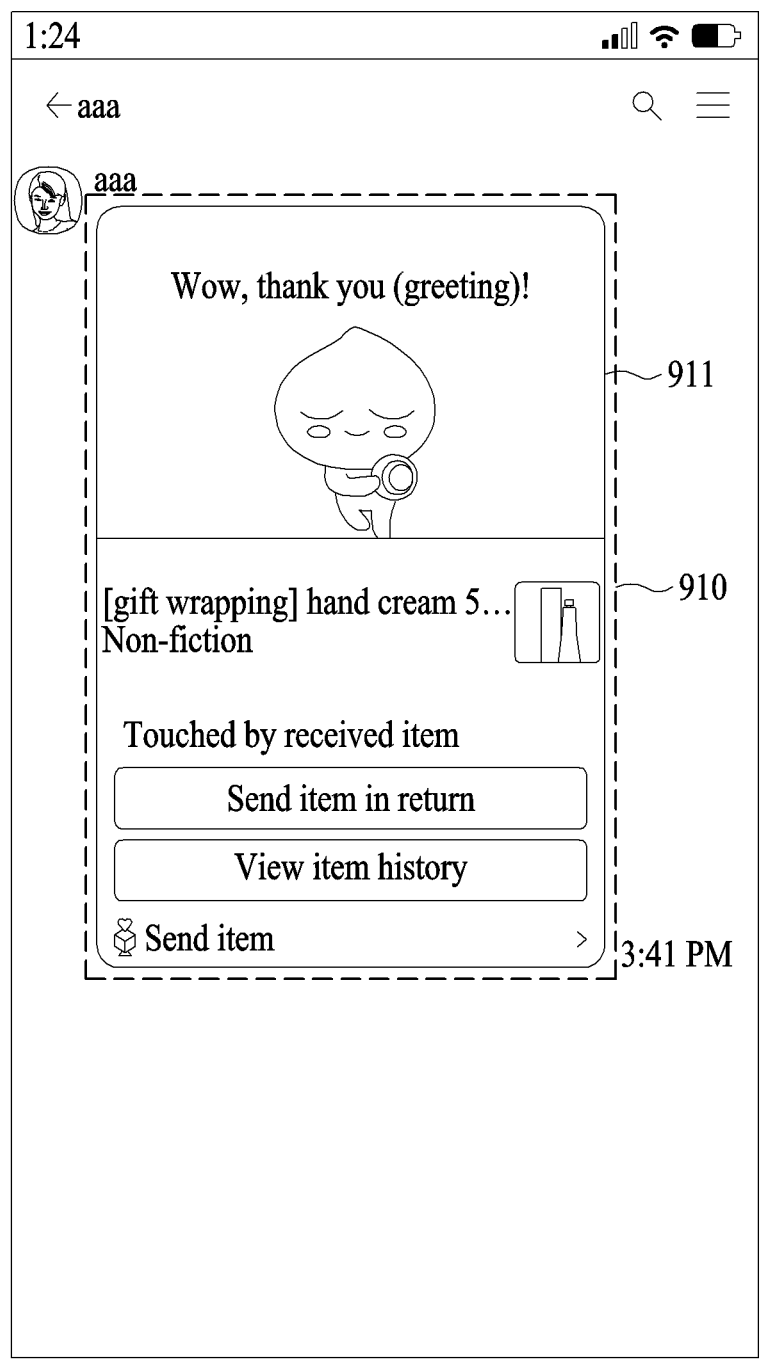
FIGS. 9A and 9B are diagrams each illustrating a message transmitted to a chatroom according to the size of a template.
Figure 9B:
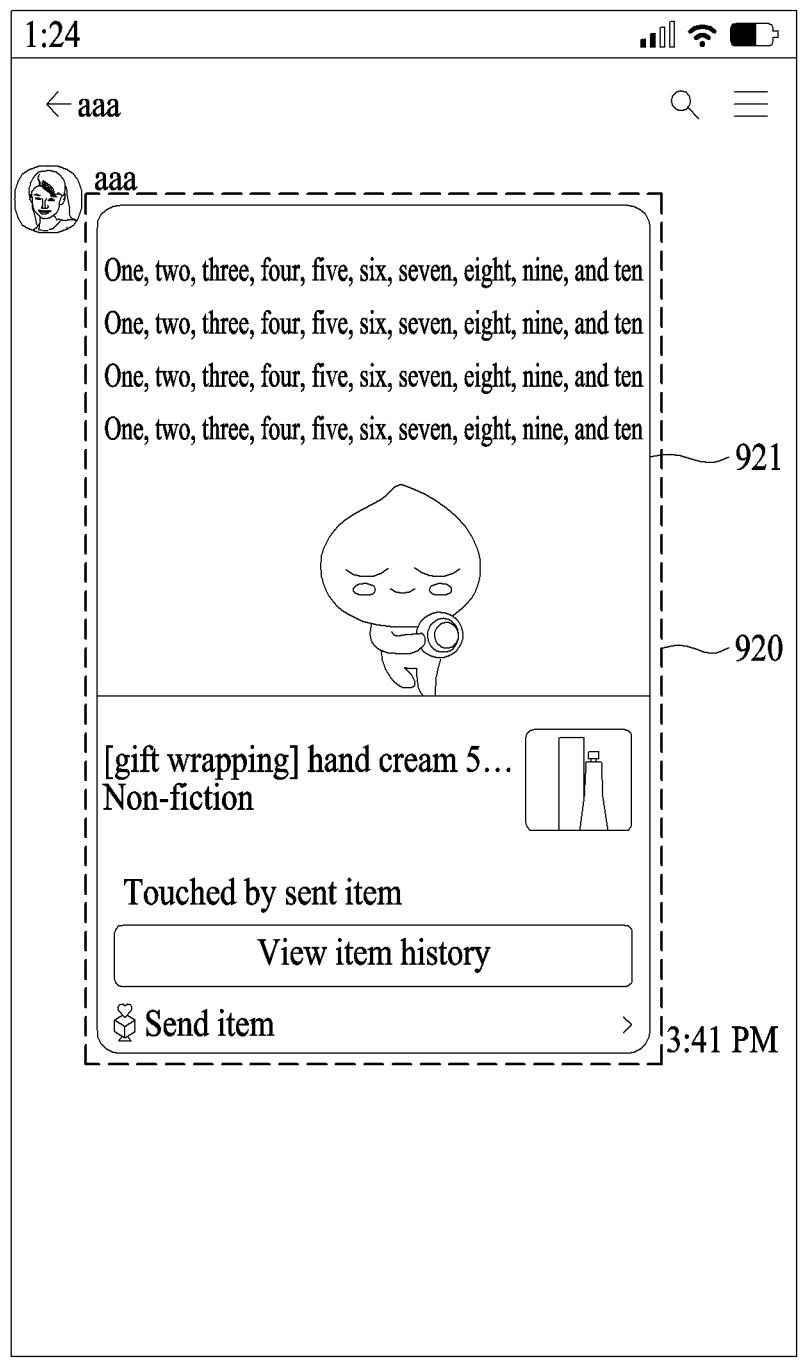

FIGS. 9A and 9B are diagrams each illustrating a message transmitted to a chatroom according to the size of a template.

Referring to a screen 901 of FIG. 9A, when the size of a template 911 is determined to be a default size, a message 910 corresponding to the template 911 may be displayed on a chatroom interface. The message 910 may include the template 911 of the default size.

Referring to a screen 902 of FIG. 9B, when the size of a template 921 is determined to be a first size according to the length of a message phrase set for the template 921, a message 920 corresponding to the template 921 may be displayed on the chatroom interface. The message 920 may include the template 921 of the first size. The message 920 corresponding to the template 921 of the first size may be displayed in a greater size than the message 910 corresponding to the template 911 of the default size illustrated in the screen 901 of FIG. 9A.

Figure 10:
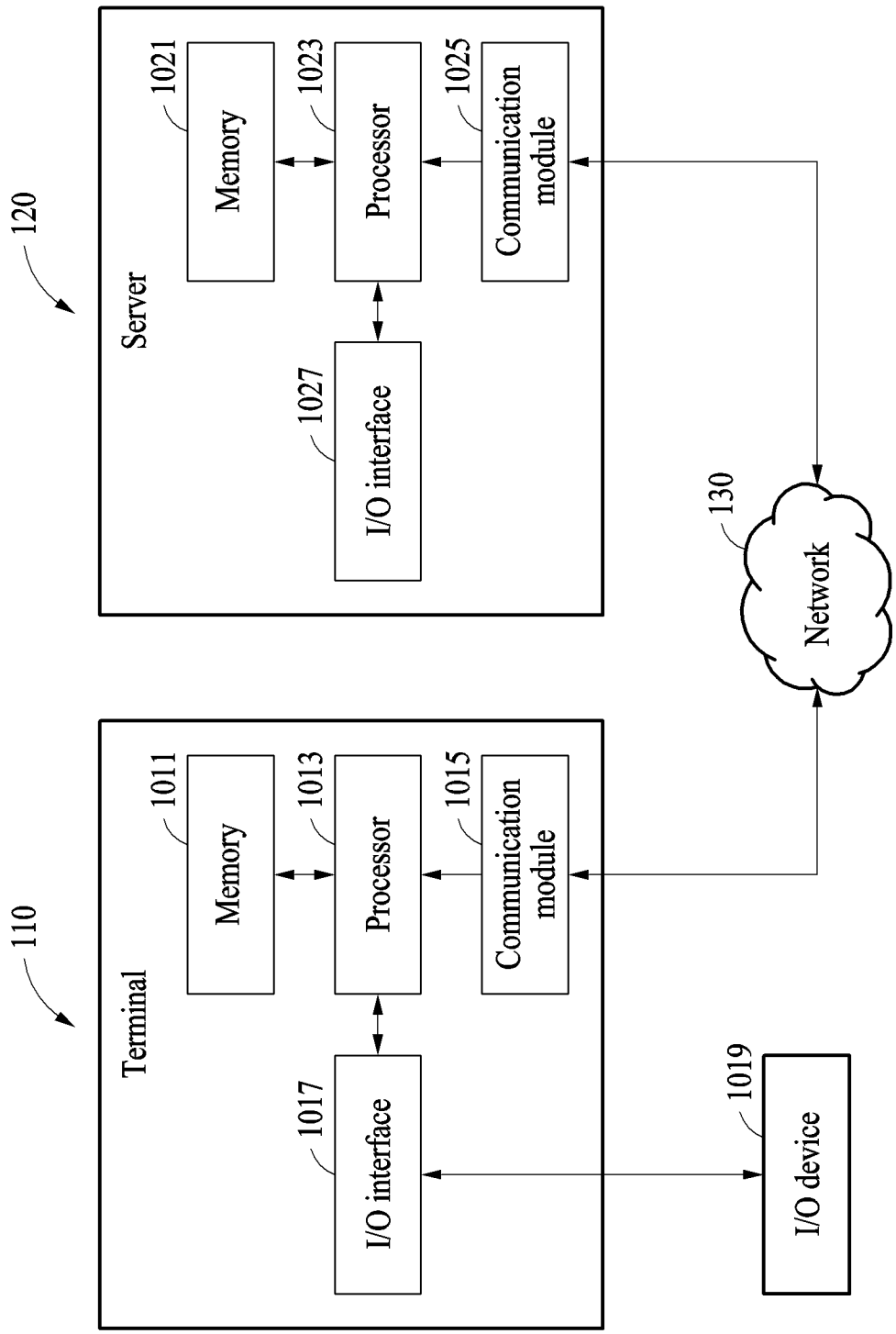
FIG. 10 is a diagram illustrating a hardware configuration of a system for the instant messaging service.

FIG. 10 is a diagram illustrating a hardware configuration of a system for the instant messaging service.

Referring to FIG. 10, the system (e.g., the system 100 of FIG. 1) may include a terminal 110 (e.g., the terminal 110 of FIG. 1) and a server 120 (e.g., the server 120 of FIG. 1) that are connected through a network 130.

The terminal 110 may be a mobile terminal implemented as a computer device. For example, the terminal 110 may communicate with the server 120 and/or other electronic devices through the network 130 by using a wired or wireless communication method.

The server 120 may be implemented as one or more computer devices providing commands, code, files, content, services, and the like by communicating with the terminal 110 and/or another device (e.g., a server) through the network 130. A communication method may not be limited and may include a communication method using a communication network (e.g., a mobile communication network, wired Internet, wireless Internet, and a broadcasting network) that may be included in the network 130 and a short-distance wireless communication method between devices. For example, the network 130 may include one or more networks among networks, such as a personal area network (PAN), a local area network (LAN), a campus area network (CAN), a metropolitan area network (MAN), a wide area network (WAN), a broadband network (BBN), the Internet, and the like.

The server 120 may provide a file for installing an application to the terminal 110 accessing the server 120 through the network 130. In this case, the terminal 110 may install the application (e.g., an instant messenger) by using the file provided by the server 120. In addition, by control of an operating system (OS) and at least one program (e.g., a browser or an installed application) that are included by the terminal 110, the terminal 110 may access the server 120 and receive a service or content provided by the server 120. For example, when the terminal 110 transmits a service request message to the server 120 through the network 130 by control of the application, the server 120 may transmit code corresponding to the service request message to the terminal 110 and the terminal 110 may provide a user with content by composing and displaying a screen according to the code.

The terminal 110 and the server 120 may respectively include memories 1011 and 1021, processors 1013 and 1023, communication modules 1015 and 1025, and input/output interfaces 1017 and 1027.

The processors 1013 and 1023 may perform at least one operation described above with reference to FIGS. 1 to 9B. For example, the processor 1013 may perform at least one operation of the terminal 110 using the instant messaging service described above with reference to FIG. 3, and the processor 1023 may perform at least one operation of the server 120 providing the instant messaging service described above with reference to FIG. 2. The processors 1013 and 1023 may be configured to process commands of a computer program by performing basic arithmetic, logic, and an input/output operation. The commands may be provided to the processors 1013 and 1023 by the memories 1011 and 1021 or the communication modules (e.g., transceivers including wired and/or wireless communication interfaces) 1015 and 1025.

The memories 1011 and 1021 may be a computer-readable storage medium, which may be volatile or non-volatile memory. The memories 1011 and 1021 may store information for the instant messaging service described above with reference to FIGS. 1 to 9B. For example, the memory 1021 may store a template and an exposure condition set for the template and may also store account information subscribing to an instant messaging service or an item transaction service linked to the server 120.

The memory 1011 may include code for an instant messenger that is installed to be driven in the terminal by files provided by the server 120 through the network 130.

The memory 1021 may store a program implementing operations for the instant messaging service described above with reference to FIGS. 1 to 9B.

The communication modules 1015 and 1025 may provide a function for the terminal 110 and the server 120 to communicate with each other through the network 130 and a function for the terminal 110 and the server 120 to communicate with another electronic device or another server through the network 130.

For example, a request generated by the processor 1013 of the terminal 110 according to program code on an instant messenger stored in a storage medium, such as the memory 1011, may be transmitted to the server 120 through the network 130 by control of the communication module 1015.

For example, control signals, commands, content, files, and the like provided by control of the processor 1023 of the server 120 may be received by the terminal 110 through the communication module 1015 of the terminal 110 after passing through the communication module 1025 and the network 130.

The input/output interfaces 1017 and 1027 may be a tool for interfacing with an input/output device 1019. For example, an input device may include a device, such as a keyboard or a mouse, and an output device may include a device, such as a display for displaying a communication session of an application. For another example, the input/output interface 1017 may be a tool for interfacing with a device integrating input and output functions, such as a touch screen. Specifically, for example, when the processor 1013 of the terminal 110 processes commands of a computer program loaded in the memory 1011, content or a service screen configured by using data provided by the server 120 may be displayed on a display through the input/output interface 1017. An input received from the user through the input/output device 1019 may be provided in a processable form in the processor 1013 of the terminal 110 through the input/output interface 1017.

The terminal 110 and the server 120 may further include other components that are not illustrated in FIG. 10. For example, the terminal 110 may be implemented to include at least a part of the input/output device 1019 described above or may further include other components, such as transceivers, global positioning system (GPS) modules, cameras, various types of sensors, databases, and the like.

An operating method of a server may provide an instant messaging service. The operating method may comprise: receiving a request for generating a message about a gift; determining an exposure condition of registered templates, based on at least one of a time of the reception of the request for generating the message and a product corresponding to the item; providing a template list comprising a template that satisfies the exposure condition to a terminal of a sender transmitting the request for generating the message; and transmitting the generated message based on a template that is selected by the sender to a terminal of a receiver of the message.

The exposure condition may comprise at least one of a condition of exposing a template when the product belongs to a certain brand; a condition of exposing a template when the product belongs to a certain category; and a condition of exposing a template when the time of the reception of the request for generating the message belongs to a preset interval.

The transmitting the message may comprise: identifying an element, set to be editable, of the template selected by the sender; changing the template based on an input of editing the element; and transmitting a message generated based on the changed template.

At least some of elements, set to be editable, of a first template among the registered templates may be different from at least some of elements, set to be editable, of a second template among the registered templates.

The transmitting the message may further comprise: identifying a message phrase set corresponding to the selected template; controlling a size of the selected template, based on a length of the message phrase; and generating the message based on the controlled size of the selected template.

The template list may comprise template lists respectively corresponding to a plurality of types, and the providing the template list may comprise determining a type of a template that satisfies the exposure condition and exposing the template through a template list corresponding to the determined type.

The request for generating the message about the gift may comprise: a request for a reply message transmitted to a gift sender who sends the gift by a gift receiver who receives the gift, wherein the sender transmitting the request for generating the message may comprise the gift receiver, and the receiver of the message comprises the gift sender.

The receiving the request for generating the message about the gift may comprise: receiving the request for generating the message about the gift, based on a message indicating reception of the gift transmitted through a chatroom.

An operating method of a terminal using an instant messaging service may comprise: transmitting a request for generating a message about a gift that is received by a user of the terminal to a server providing the instant messaging service; receiving a template list comprising a template determined to satisfy an exposure condition, based on at least one of a time of the reception of the request for generating the message and a product corresponding to the gift; and requesting the server to transmit a message generated based on a template selected from the template list.

The requesting the server to transmit the message may comprise: requesting editing of the selected template; changing the selected template based on an input of editing the selected template when the selected template is editable; and requesting transmission of a message generated based on the changed template.

The transmitting the request for generating the message may comprise: transmitting a request for generating a reply message for the gift, in which a gift sender who sends the gift is designated as a receiver, to the server through a message indicating reception of the gift.

A non-transitory computer-readable storage medium storing instructions that, when executed by a processor, cause the processor to perform the operating method described herein.

A server providing an instant messaging service may comprise a processor configured to receive a request for generating a message about a gift, determine an exposure condition of registered templates, based on at least one of a time of the reception of the request for generating the message and a product corresponding to the gift, provide a template list comprising a template that satisfies the exposure condition to a terminal of a sender transmitting the request for generating the message, and transmit the generated message based on a template that is selected by the sender to a terminal of a receiver of the message.

The exposure condition may comprise at least one of a condition of exposing a template when the product belongs to a certain brand; a condition of exposing a template when the product belongs to a certain category; and a condition of exposing a template when the time of the reception of the request for generating the message belongs to a preset interval.

The processor may be further configured to, when transmitting the message, identify an element, set to be editable, of the template selected by the sender, change the template based on an input of editing the element, and transmit a message generated based on the changed template.

The processor may be further configured to, when transmitting the message, identify a message phrase set corresponding to the selected template, control a size of the selected template, based on a length of the message phrase, and generate the message based on the controlled size of the selected template.

The processor may be further configured to, when receiving the request for generating the message about the gift, receive the request for generating the message about the gift, based on a message indicating reception of the gift transmitted through a chatroom.

A terminal using an instant messaging service may comprise a processor configured to transmit a request for generating a message about a gift that is received by a user of the terminal to a server providing the instant messaging service, receive a template list comprising a template determined to satisfy an exposure condition, based on at least one of a time of the reception of the request for generating the message and a product corresponding to the gift, and request the server to transmit a message generated based on a template selected from the template list.

The processor may be further configured to, when requesting the server to transmit the message, request editing of the selected template, change the selected template based on an input of editing the selected template when the selected template is editable, and request transmission of a message generated based on the changed template.

The processor may be further configured to, when transmitting the request for generating the message, transmit a request for generating a reply message for the gift, in which a gift sender who sends the gift is designated as a receiver, to the server through a message indicating reception of the gift.

The examples described herein may be implemented by using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. The processing device may run an operating OS and one or more software applications that run on the OS. The processing device also may access, store, manipulate, process, and create data in response to execution of the software. For the purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs and/or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described devices may act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A terminal comprising:
    a display configured to receive at least one user input;
    a communication interface;
    at least one processor; and
    memory storing instructions that, when executed by the at least one processor, cause the terminal to:
        execute a messenger application installed on the terminal, wherein a user of the messenger application is logged into, via the terminal and using a user account of an instant messaging service associated with one or more item transactions, the instant messaging service, and wherein the instant messaging service is provided via communication between the terminal and a messaging service server;
        receive, based on an item transaction service provided by an item transaction server linked to the messaging service server, an indication associated with the item transaction service;
        identify a type of item acquired via the one or more item transactions by processing a previous message transmitted via a chatroom interface of the executed messenger application;
        determine, based on the type of item, a list of user interface templates that correspond to the type of item;
        display, in the chatroom interface of the executed messenger application, a first user interface screen associated with the item transaction service, wherein the first user interface screen associated with the item transaction service comprises:
            sender information associated with the one or more item transactions;
            a message associated with the one or more item transactions;
            information indicating an identifier of an item of the one or more item transactions; and
            an interfacing object associated with the list of user interface templates;
        receive, based on a user selection of the interfacing object and based on at least one exposure condition associated with the list of user interface templates, at least one user interface template selected from the list of user interface templates;
        display, in a second user interface screen of the executed messenger application, a first user interface template of the at least one user interface template, wherein the first user interface template comprises:
            an editable user interface element; and
            a non-editable user interface element;
        modify, based on an editing input, the editable user interface element; and
        transmit, based on the modified editable user interface element, a message comprising a modified template associated with the first user interface template.

2. The terminal of claim 1, wherein the second user interface screen is configured to:
    include a preset message phrase, of the editable user interface element, configured to be selectable; and
    based on a selection of the preset message phrase, display a virtual keyboard to edit the preset message phrase.

3. The terminal of claim 1, wherein the second user interface screen is configured to:
    include a preset message phrase, of the editable user interface element, configured to be editable;
    include a restoring interfacing object configured to be selectable; and
    based on a selection of the restoring interfacing object, restore the preset message phrase.

4. The terminal of claim 1, wherein the second user interface screen is configured to:
    include a preset message phrase configured to be not editable; and
    include a message notifying that the preset message phrase is not editable.

5. The terminal of claim 1, wherein the second user interface screen is configured to be maintained, based on a message phrase length being less than or equal to a threshold value, at a default size; and
    wherein the message comprising the modified template is framed within the default size.

6. The terminal of claim 1, wherein the second user interface screen is configured to be expanded, based on a message phrase length exceeding a threshold value, beyond a default size; and
    wherein the message comprising the modified template is framed in a greater size than the default size.

7. The terminal of claim 1, wherein the at least one exposure condition comprises at least one of: a reception time of the user selection of the interfacing object, a brand associated with the item, or a category of the item.

8. The terminal of claim 1, wherein the instructions, when executed by the at least one processor, cause the terminal to:
    access the item transaction service provided by the item transaction server.

9. A terminal comprising:
    a display configured to receive at least one user input;
    a communication interface;
    at least one processor; and
    memory storing instructions that, when executed by the at least one processor, cause the terminal to:
        execute a messenger application installed on the terminal, wherein a user of the messenger application is logged into, via the terminal and using a user account of an instant messaging service associated with one or more item transactions, the instant messaging service, and wherein the instant messaging service is provided via communication between the terminal and a messaging service server;

receive, based on an item transaction service provided by an item transaction server linked to the messaging service server, an indication associated with the item transaction service;

identify a type of item acquired via the one or more item transactions by processing a previous message transmitted via a chatroom interface of the executed messenger application;

determine, based on the type of item, a list of templates that correspond to the type of item:

display, in a first user interface screen of the executed messenger application, a first interfacing object associated with the item transaction service;

determine, based on a user selection of the first interfacing object and based on at least one exposure condition associated with the list of templates, at least one template selected from the list of templates;

display a second user interface screen of the executed messenger application, wherein the second user interface screen comprises:
  a tab area configured to display selectable template types;
  a template list area configured to display, based on a selected type of the selectable template types, a list of selectable templates of the at least one template;
  a preview window area configured to display a selected template of the selectable templates and an editing tool to edit the selected template; and
  a second interfacing object configured to transmit an edited template; and transmit, to another terminal via the messaging service server, a message comprising the edited template.

10. The terminal of claim 9, wherein the instructions, when executed by the at least one processor, cause the terminal to display the first user interface screen in the chatroom interface; and
  wherein the template list area is further configured to display, based on the at least one exposure condition, the list of selectable templates.

11. The terminal of claim 10, wherein the at least one exposure condition comprises at least one of: a reception time of request for displaying the second user interface screen, a brand associated with an item of an item transaction, or a category of the item.

12. The terminal of claim 9, wherein the preview window area is further configured to:
  include a preset message phrase configured to be selectable; and
  based on a selection of the preset message phrase, display a virtual keyboard as the editing tool to edit the preset message phrase.

13. The terminal of claim 9, wherein the preview window area is further configured to:
  include a preset message phrase configured to be editable;
  include a restoring interfacing object configured to be selectable; and
  based on a selection of the restoring interfacing object, restore the preset message phrase.

14. The terminal of claim 9, wherein the preview window area is further configured to:
  include a preset message phrase configured to be not editable; and
  include a message notifying that the preset message phrase is not editable.

15. The terminal of claim 9, wherein the preview window area is further configured to be maintained, based on a message phrase length being less than or equal to a threshold value, at a default size; and
  wherein the second interfacing object is further configured to transmit, based on a user input, the edited template, wherein the edited template is framed within the default size.

16. The terminal of claim 9, wherein the preview window area is further configured to be expanded, based on a message phrase length exceeding a threshold value, beyond a default size; and
  wherein the second interfacing object is further configured to transmit, based on a user input, the edited template, wherein the edited template is framed in a greater size than the default size.

17. A method comprising:
  executing, by a computing device, a messenger application installed on the computing device, wherein a user of the messenger application is logged into, via the computing device and using a user account of an instant messaging service associated with one or more item transactions, the instant messaging service, and wherein the instant messaging service is provided via communication between the computing device and a messaging service server;
  receiving, by the computing device and based on an item transaction service provided by an item transaction server linked to the messaging service server, an indication associated with the item transaction service;
  identifying, by the computing device, a type of item acquired via the one or more item transactions by processing a previous message transmitted via a chatroom interface of the executed messenger application;
  determining, by the computing device and based on the type of item, a list of user interface templates that correspond to the type of item;
  displaying, by the computing device and in the chatroom interface of the executed messenger application, a first user interface screen associated with the item transaction service, wherein the first user interface screen associated with the item transaction service comprises:
    sender information associated with the one or more item transactions;
    a message associated with the one or more item transactions;
    information indicating an identifier of an item of the one or more item transactions; and
    an interfacing object associated with the list of user interface templates;
  receiving, by the computing device, based on a user selection of the interfacing object, and based on at least one exposure condition associated with the list of user interface templates, at least one user interface template selected from the list of user interface templates;
  displaying, by the computing device and in a second user interface screen of the executed messenger application, a first user interface template of the at least one user interface template, wherein the first user interface template comprises:
    an editable user interface element; and
    a non-editable user interface element;
  modifying, by the computing device and based on an editing input, the editable user interface element; and transmitting, by the computing device and based on the modified editable user interface element, a message comprising a modified template associated with the first user interface template.

18. The method of claim 17, wherein the second user interface screen is configured to:
include a preset message phrase, of the editable user interface element, configured to be selectable; and
based on a selection of the preset message phrase, display a virtual keyboard to edit the preset message phrase.

19. The method of claim 17, wherein the second user interface screen is configured to:
include a preset message phrase, of the editable user interface element, configured to be editable;
include a restoring interfacing object configured to be selectable; and
based on a selection of the restoring interfacing object, restore the preset message phrase.

20. The method of claim 17, wherein the second user interface screen is configured to:
include a preset message phrase configured to be not editable; and
include a message notifying that the preset message phrase is not editable.

* * * * *